(12) United States Patent
Konicek

(10) Patent No.: US 11,818,458 B2
(45) Date of Patent: *Nov. 14, 2023

(54) CAMERA TOUCHPAD

(71) Applicant: Cutting Edge Vision LLC, Scottsdale, AZ (US)

(72) Inventor: Jeffrey C. Konicek, Tolono, IL (US)

(73) Assignee: Cutting Edge Vision, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,397

(22) Filed: Jul. 22, 2021

(65) Prior Publication Data

US 2021/0352205 A1 Nov. 11, 2021

Related U.S. Application Data

(60) Continuation of application No. 16/663,742, filed on Oct. 25, 2019, now Pat. No. 11,153,472, which is a
(Continued)

(51) Int. Cl.
*H04N 23/66* (2023.01)
*G03B 17/02* (2021.01)
(Continued)

(52) U.S. Cl.
CPC ............. *H04N 23/66* (2023.01); *G03B 13/02* (2013.01); *G03B 17/02* (2013.01); *G03B 29/00* (2013.01);
(Continued)

(58) Field of Classification Search
None
See application file for complete search history.

(56) References Cited

U.S. PATENT DOCUMENTS

| 2,950,971 A | 8/1960 | George |
|---|---|---|
| 3,403,223 A | 9/1968 | Derk |

(Continued)

FOREIGN PATENT DOCUMENTS

| AU | 709833 | 9/1999 |
|---|---|---|
| AU | 2004221365 | 2/2011 |

(Continued)

OTHER PUBLICATIONS

Adams, Russ, "Sourcebook of Automatic Identification and Data, Collection," Van Norstand Reinhold; New York, Dec. 31, 1990.
(Continued)

*Primary Examiner* — Rodney E Fuller
(74) *Attorney, Agent, or Firm* — The Law Offices of Lisa and Lesko, LLC; Justin Lesko, Esq.

(57) ABSTRACT

A system and method is disclosed for enabling user friendly interaction with a camera system. Specifically, the inventive system and method has several aspects to improve the interaction with a camera system, including voice recognition, gaze tracking, touch sensitive inputs and others. The voice recognition unit is operable for, among other things, receiving multiple different voice commands, recognizing the vocal commands, associating the different voice commands to one camera command and controlling at least some aspect of the digital camera operation in response to these voice commands. The gaze tracking unit is operable for, among other things, determining the location on the viewfinder image that the user is gazing upon. One aspect of the touch sensitive inputs provides that the touch sensitive pad is mouse-like and is operable for, among other things, receiving user touch inputs to control at least some aspect of the camera operation. Another aspect of the disclosed invention provides for gesture recognition to be used to interface with and control the camera system.

1 Claim, 8 Drawing Sheets

Related U.S. Application Data continuation of application No. 14/614,515, filed on Feb. 5, 2015, now abandoned, which is a continuation of application No. 14/539,687, filed on Nov. 12, 2014, now Pat. No. 9,485,403, which is a continuation of application No. 14/495,976, filed on Sep. 25, 2014, now Pat. No. 8,917,982, which is a continuation of application No. 14/453,511, filed on Aug. 6, 2014, now Pat. No. 8,923,692, which is a continuation of application No. 14/315,544, filed on Jun. 26, 2014, now Pat. No. 8,897,634, which is a continuation of application No. 14/203,129, filed on Mar. 10, 2014, now Pat. No. 8,818,182, which is a continuation of application No. 13/717,681, filed on Dec. 17, 2012, now Pat. No. 8,831,418, which is a continuation of application No. 13/087,650, filed on Apr. 15, 2011, now Pat. No. 8,467,672, which is a continuation of application No. 12/710,066, filed on Feb. 22, 2010, now Pat. No. 7,933,508, which is a division of application No. 11/163,391, filed on Oct. 17, 2005, now Pat. No. 7,697,827.

(51) Int. Cl.

| | | |
|---|---|---|
| *G03B 29/00* | (2021.01) | |
| *G03B 31/06* | (2021.01) | |
| *H04N 23/57* | (2023.01) | |
| *H04N 23/62* | (2023.01) | |
| *H04N 23/60* | (2023.01) | |
| *H04N 23/611* | (2023.01) | |
| *H04N 23/63* | (2023.01) | |
| *H04N 23/661* | (2023.01) | |
| *H04N 1/00* | (2006.01) | |
| *G03B 13/02* | (2021.01) | |
| *G06F 3/041* | (2006.01) | |
| *G10L 15/22* | (2006.01) | |
| *G10L 17/22* | (2013.01) | |
| *H04M 3/42* | (2006.01) | |
| *H04N 1/21* | (2006.01) | |

(52) U.S. Cl.
CPC ............. *G03B 31/06* (2013.01); *G06F 3/041* (2013.01); *G10L 15/22* (2013.01); *G10L 17/22* (2013.01); *H04M 3/42204* (2013.01); *H04N 1/00095* (2013.01); *H04N 1/00204* (2013.01); *H04N 1/00209* (2013.01); *H04N 1/00212* (2013.01); *H04N 1/00244* (2013.01); *H04N 1/2112* (2013.01); *H04N 23/57* (2023.01); *H04N 23/611* (2023.01); *H04N 23/62* (2023.01); *H04N 23/631* (2023.01); *H04N 23/64* (2023.01); *H04N 23/661* (2023.01); *G10L 2015/223* (2013.01); *H04N 2201/0084* (2013.01)

(56) References Cited

U.S. PATENT DOCUMENTS

| | | |
|---|---|---|
| 3,439,598 A | 4/1969 | Weitzner et al. |
| 3,483,324 A | 12/1969 | Gorike |
| 3,639,920 A | 2/1972 | Griffin et al. |
| 3,751,602 A | 8/1973 | Breeden |
| 3,755,625 A | 8/1973 | Maston |
| 3,770,892 A | 11/1973 | Clapper |
| 3,777,222 A * | 12/1973 | Harris ............... H01H 13/702 341/26 |
| 3,793,489 A | 2/1974 | Sank |
| 3,814,856 A | 6/1974 | Dugan |
| 3,877,790 A | 4/1975 | Robinson |
| 3,973,081 A | 8/1976 | Hutchins |
| 3,994,283 A | 11/1976 | Farley |
| 4,003,063 A | 1/1977 | Takahashi et al. |
| 4,021,828 A | 5/1977 | Iura et al. |
| 4,081,623 A | 3/1978 | Vogeley |
| 4,082,873 A | 4/1978 | Williams |
| 4,087,630 A | 5/1978 | Browning et al. |
| 4,090,032 A | 5/1978 | Schrader |
| D248,669 S | 7/1978 | Ramsey |
| 4,099,025 A | 7/1978 | Kahn |
| 4,158,750 A | 6/1979 | Sakoe et al. |
| 4,192,590 A | 3/1980 | Kitaura |
| 4,195,641 A | 4/1980 | Joines et al. |
| 4,207,959 A | 6/1980 | Youdin et al. |
| 4,209,244 A | 6/1980 | Sahara et al. |
| 4,219,260 A | 8/1980 | Date et al. |
| 4,221,927 A | 9/1980 | Dankman et al. |
| 4,222,644 A | 9/1980 | Tano et al. |
| 4,222,658 A | 9/1980 | Mandel |
| 4,227,177 A | 10/1980 | Moshier |
| 4,237,339 A | 12/1980 | Bunting et al. |
| 4,270,852 A | 6/1981 | Suzuki et al. |
| 4,270,853 A | 6/1981 | Hatada et al. |
| 4,270,854 A | 6/1981 | Stemme et al. |
| 4,285,559 A | 8/1981 | Koch |
| 4,288,078 A | 9/1981 | Lugo |
| 4,290,685 A | 9/1981 | Ban |
| 4,308,425 A | 12/1981 | Momose et al. |
| 4,334,740 A | 6/1982 | Wray |
| 4,340,800 A | 7/1982 | Ueda et al. |
| 4,344,682 A | 8/1982 | Hattori |
| 4,354,059 A | 10/1982 | Ishigaki et al. |
| 4,386,834 A | 6/1983 | Toolan |
| 4,389,109 A | 6/1983 | Taniguchi et al. |
| 4,393,271 A | 7/1983 | Fujinami et al. |
| 4,399,327 A | 8/1983 | Yamamoto et al. |
| 4,434,507 A | 2/1984 | Thomas |
| 4,443,077 A | 4/1984 | Tanikawa |
| 4,450,545 A | 5/1984 | Noso et al. |
| 4,472,742 A | 9/1984 | Hasegawa et al. |
| 4,485,484 A | 11/1984 | Flanagan |
| 4,489,442 A | 12/1984 | Anderson et al. |
| 4,501,012 A | 2/1985 | Kishi et al. |
| 4,503,528 A | 3/1985 | Nojiri et al. |
| 4,506,378 A | 3/1985 | Noso et al. |
| 4,520,576 A | 6/1985 | Molen |
| 4,531,818 A | 7/1985 | Bally |
| 4,538,295 A | 8/1985 | Noso et al. |
| 4,538,894 A | 9/1985 | Shirane |
| 4,542,969 A | 9/1985 | Omura |
| 4,550,343 A | 10/1985 | Nakatani |
| 4,557,271 A | 12/1985 | Stoller et al. |
| 4,563,780 A | 1/1986 | Pollack |
| 4,567,606 A | 1/1986 | Vensko et al. |
| 4,595,990 A | 6/1986 | Garwin |
| 4,597,098 A | 6/1986 | Noso et al. |
| 4,613,911 A | 9/1986 | Ohta |
| 4,627,620 A | 12/1986 | Yang |
| 4,630,910 A | 12/1986 | Ross et al. |
| 4,635,286 A | 1/1987 | Bui et al. |
| 4,641,292 A | 2/1987 | Tunnell et al. |
| 4,642,717 A | 2/1987 | Matsuda et al. |
| 4,645,458 A | 2/1987 | Williams |
| 4,648,052 A | 3/1987 | Friedman et al. |
| 4,658,425 A | 4/1987 | Julstrom |
| 4,679,924 A | 7/1987 | Wamsley |
| 4,695,953 A | 9/1987 | Blair et al. |
| 4,702,475 A | 10/1987 | Elstein et al. |
| 4,711,543 A | 12/1987 | Blair et al. |
| 4,717,364 A | 1/1988 | Furukawa |
| 4,742,369 A | 5/1988 | Ishii et al. |
| 4,742,548 A | 5/1988 | Sessler et al. |
| 4,746,213 A | 5/1988 | Knapp |
| 4,751,642 A | 6/1988 | Silva et al. |
| 4,757,388 A | 7/1988 | Someya et al. |
| 4,761,641 A | 8/1988 | Schreiber |
| 4,764,817 A | 8/1988 | Blazek et al. |
| 4,776,016 A | 10/1988 | Hansen |
| 4,780,906 A | 10/1988 | Rajasekaran et al. |

(56) References Cited

U.S. PATENT DOCUMENTS

| | | |
|---|---|---|
| 4,783,803 A | 11/1988 | Baker et al. |
| 4,794,934 A | 1/1989 | Motoyama et al. |
| 4,796,997 A | 1/1989 | Svetkoff et al. |
| 4,797,927 A | 1/1989 | Schaire |
| 4,807,051 A | 2/1989 | Ogura |
| 4,807,273 A | 2/1989 | Haendle |
| 4,809,065 A | 2/1989 | Harris et al. |
| 4,809,332 A | 2/1989 | Jongman et al. |
| 4,817,158 A | 3/1989 | Picheny |
| 4,817,950 A | 4/1989 | Goo |
| 4,827,520 A | 5/1989 | Zeinstra |
| 4,833,713 A | 5/1989 | Muroi et al. |
| 4,836,670 A | 6/1989 | Hutchinson |
| 4,837,817 A | 6/1989 | Maemori |
| 4,843,568 A | 6/1989 | Krueger et al. |
| 4,862,278 A | 8/1989 | Dann et al. |
| 4,866,470 A | 9/1989 | Arai et al. |
| D305,648 S | 1/1990 | Edington |
| 4,893,183 A | 1/1990 | Nayar |
| 4,895,231 A | 1/1990 | Yamaguchi et al. |
| 4,901,362 A | 2/1990 | Terzian |
| 4,905,029 A | 2/1990 | Kelley |
| 4,925,189 A | 5/1990 | Braeunig |
| 4,950,069 A | 8/1990 | Hutchinson |
| 4,951,079 A | 8/1990 | Hoshino et al. |
| 4,953,029 A | 8/1990 | Morimoto et al. |
| 4,953,222 A | 8/1990 | Roberts |
| 4,961,211 A | 10/1990 | Tsugane et al. |
| 4,965,626 A | 10/1990 | Robison et al. |
| 4,965,775 A | 10/1990 | Elko et al. |
| 4,973,149 A | 11/1990 | Hutchinson |
| 4,977,419 A | 12/1990 | Wash et al. |
| 4,980,918 A | 12/1990 | Bahl et al. |
| 4,983,996 A | 1/1991 | Kinoshita |
| 4,989,253 A | 1/1991 | Liang et al. |
| 5,005,041 A | 4/1991 | Suda et al. |
| 5,023,635 A | 6/1991 | Nealon |
| 5,025,283 A | 6/1991 | Robison |
| 5,027,149 A | 6/1991 | Hoshino et al. |
| 5,048,091 A | 9/1991 | Sato et al. |
| 5,062,010 A | 10/1991 | Saito |
| 5,069,732 A | 12/1991 | Levine |
| 5,070,355 A | 12/1991 | Inoue et al. |
| 5,074,683 A | 12/1991 | Tarn et al. |
| 5,086,385 A | 2/1992 | Launey et al. |
| 5,097,278 A | 3/1992 | Tamamura et al. |
| 5,099,262 A | 3/1992 | Tanaka et al. |
| 5,101,444 A | 3/1992 | Wilson et al. |
| 5,111,410 A | 5/1992 | Nakayama et al. |
| 5,121,426 A | 6/1992 | Baumhauer, Jr. et al. |
| 5,127,055 A | 6/1992 | Larkey |
| 5,128,700 A | 7/1992 | Inoue et al. |
| 5,128,705 A | 7/1992 | Someya et al. |
| 5,134,680 A | 7/1992 | Schempp |
| 5,146,249 A | 9/1992 | Hoda et al. |
| 5,148,154 A | 9/1992 | MacKay et al. |
| 5,160,952 A | 11/1992 | Iwashita et al. |
| 5,164,831 A | 11/1992 | Kuchta et al. |
| 5,184,295 A | 2/1993 | Mann |
| 5,193,117 A | 3/1993 | Ono et al. |
| 5,204,709 A | 4/1993 | Sato |
| 5,208,453 A | 5/1993 | Hostetler |
| 5,210,560 A | 5/1993 | Labaziewicz |
| 5,210,566 A | 5/1993 | Nishida |
| 5,212,647 A | 5/1993 | Raney et al. |
| 5,229,754 A | 7/1993 | Aoki et al. |
| 5,229,756 A | 7/1993 | Kosugi et al. |
| 5,230,023 A | 7/1993 | Nakano |
| 5,239,337 A | 8/1993 | Takagi et al. |
| 5,239,463 A | 8/1993 | Blair et al. |
| 5,239,464 A | 8/1993 | Blair et al. |
| 5,241,619 A | 8/1993 | Schwartz et al. |
| 5,245,372 A | 9/1993 | Aoshima |
| 5,245,381 A | 9/1993 | Takagi et al. |
| 5,253,008 A | 10/1993 | Konishi et al. |
| 5,274,862 A | 1/1994 | Palmer |
| 5,288,078 A | 2/1994 | Capper et al. |
| 5,295,491 A | 3/1994 | Gevins |
| 5,297,210 A | 3/1994 | Julstrom |
| 5,303,148 A | 4/1994 | Mattson et al. |
| 5,303,373 A | 4/1994 | Harootian |
| 5,313,542 A | 5/1994 | Castonguay |
| 5,320,538 A | 6/1994 | Baum |
| 5,331,149 A | 7/1994 | Spitzer et al. |
| 5,335,011 A | 8/1994 | Addeo et al. |
| 5,335,041 A | 8/1994 | Fox |
| 5,335,072 A | 8/1994 | Tanaka et al. |
| 5,335,313 A | 8/1994 | Douglas |
| 5,345,281 A | 9/1994 | Taboada et al. |
| 5,345,538 A | 9/1994 | Narayannan et al. |
| 5,347,306 A | 9/1994 | Nitta |
| 5,363,481 A | 11/1994 | Tilt |
| 5,365,302 A | 11/1994 | Kodama |
| 5,366,379 A | 11/1994 | Yang et al. |
| 5,367,315 A | 11/1994 | Pan |
| 5,372,147 A | 12/1994 | Lathrop et al. |
| 5,373,341 A | 12/1994 | SanGregory |
| 5,385,519 A | 1/1995 | Hsu et al. |
| 5,386,494 A | 1/1995 | White |
| 5,404,189 A | 4/1995 | Labaziewicz et al. |
| 5,404,397 A | 4/1995 | Janse et al. |
| 5,405,152 A | 4/1995 | Katanics et al. |
| 5,417,210 A | 5/1995 | Funda et al. |
| 5,423,554 A | 6/1995 | Davis |
| 5,425,129 A | 6/1995 | Garman et al. |
| 5,426,510 A | 6/1995 | Meredith |
| 5,426,745 A | 6/1995 | Baji et al. |
| 5,427,113 A | 6/1995 | Hiroshi et al. |
| 5,446,512 A | 8/1995 | Mogamiya |
| 5,452,397 A | 9/1995 | Ittycheriah et al. |
| 5,454,043 A | 9/1995 | Freeman |
| 5,459,511 A | 10/1995 | Uehara et al. |
| 5,461,453 A | 10/1995 | Watanabe et al. |
| 5,465,317 A | 11/1995 | Epstein |
| 5,469,740 A | 11/1995 | French et al. |
| 5,471,542 A | 11/1995 | Ragland |
| 5,475,792 A | 12/1995 | Stanford et al. |
| 5,475,798 A | 12/1995 | Handlos |
| 5,477,264 A | 12/1995 | Sarbadhikari et al. |
| 5,481,622 A | 1/1996 | Gerhardt et al. |
| 5,486,892 A | 1/1996 | Suzuki et al. |
| 5,495,576 A | 2/1996 | Ritchey |
| 5,508,663 A | 4/1996 | Konno |
| 5,508,774 A | 4/1996 | Klees |
| 5,510,981 A | 4/1996 | Berger et al. |
| 5,511,256 A | 4/1996 | Capaldi |
| 5,513,298 A | 4/1996 | Stanford et al. |
| 5,515,130 A | 5/1996 | Tsukahara et al. |
| 5,516,105 A | 5/1996 | Eisenbrey et al. |
| 5,517,021 A | 5/1996 | Kaufman |
| 5,519,809 A | 5/1996 | Husseiny et al. |
| 5,521,635 A | 5/1996 | Mitsuhashi et al. |
| 5,524,637 A | 6/1996 | Erickson |
| 5,534,917 A | 7/1996 | MacDougall |
| 5,541,400 A | 7/1996 | Hagiwara et al. |
| 5,541,656 A | 7/1996 | Kare et al. |
| 5,544,654 A | 8/1996 | Murphy et al. |
| 5,546,145 A | 8/1996 | Bernardi et al. |
| 5,548,335 A | 8/1996 | Mitsuhashi et al. |
| 5,550,380 A | 8/1996 | Sugawara et al. |
| 5,550,628 A | 8/1996 | Kawabata |
| 5,557,358 A | 9/1996 | Mukai et al. |
| 5,561,737 A | 10/1996 | Bowen |
| 5,563,988 A | 10/1996 | Maes et al. |
| 5,566,272 A | 10/1996 | Brems et al. |
| 5,570,151 A | 10/1996 | Terunuma et al. |
| 5,573,506 A | 11/1996 | Vasko |
| 5,577,981 A | 11/1996 | Jarvik |
| 5,579,037 A | 11/1996 | Tahara et al. |
| 5,579,046 A | 11/1996 | Mitsuhashi et al. |
| 5,579,080 A | 11/1996 | Irie et al. |
| 5,580,249 A | 12/1996 | Jacobsen et al. |
| 5,581,323 A | 12/1996 | Suzuki et al. |
| 5,581,485 A | 12/1996 | Van Aken |

(56) References Cited

U.S. PATENT DOCUMENTS

| | | |
|---|---|---|
| 5,581,655 A | 12/1996 | Cohen et al. |
| 5,594,469 A | 1/1997 | Freeman et al. |
| 5,597,309 A | 1/1997 | Riess |
| 5,600,399 A | 2/1997 | Yamada et al. |
| 5,602,458 A | 2/1997 | Dowe |
| 5,603,127 A | 2/1997 | Veal |
| 5,606,390 A | 2/1997 | Arai et al. |
| 5,609,938 A | 3/1997 | Shields |
| 5,614,763 A | 3/1997 | Womack |
| 5,615,296 A | 3/1997 | Stanford et al. |
| 5,616,078 A | 4/1997 | Oh |
| 5,617,312 A | 4/1997 | Iura et al. |
| 5,633,678 A | 5/1997 | Parulski et al. |
| 5,634,141 A | 5/1997 | Akashi et al. |
| 5,637,849 A | 6/1997 | Wang et al. |
| 5,638,300 A | 6/1997 | Johnson |
| 5,640,612 A | 6/1997 | Owashi |
| 5,641,288 A | 6/1997 | Zaenglein |
| 5,644,642 A | 7/1997 | Kirschbaum |
| 5,647,025 A | 7/1997 | Frost et al. |
| 5,655,172 A | 8/1997 | Omi et al. |
| 5,664,021 A | 9/1997 | Chu et al. |
| 5,664,133 A | 9/1997 | Malamud et al. |
| 5,664,243 A | 9/1997 | Okada et al. |
| 5,666,215 A | 9/1997 | Fredlund et al. |
| 5,666,566 A | 9/1997 | Gu et al. |
| 5,668,928 A | 9/1997 | Groner |
| 5,670,992 A | 9/1997 | Iizuka et al. |
| 5,672,840 A | 9/1997 | Sage et al. |
| 5,673,327 A | 9/1997 | Julstrom |
| 5,675,633 A | 10/1997 | Kopp et al. |
| 5,677,834 A | 10/1997 | Mooneyham |
| 5,680,709 A | 10/1997 | Stone |
| 5,682,030 A | 10/1997 | Kubon |
| 5,682,196 A | 10/1997 | Freeman |
| 5,682,229 A | 10/1997 | Wangler |
| 5,689,619 A | 11/1997 | Smyth |
| 5,690,582 A | 11/1997 | Ulrich et al. |
| 5,703,367 A | 12/1997 | Hashimoto et al. |
| 5,704,837 A | 1/1998 | Iwasaki et al. |
| 5,706,049 A | 1/1998 | Moghadam et al. |
| 5,708,863 A | 1/1998 | Satoh et al. |
| 5,710,866 A | 1/1998 | Alleva et al. |
| 5,715,334 A | 2/1998 | Peters |
| 5,715,548 A | 2/1998 | Weismiller et al. |
| 5,715,834 A | 2/1998 | Bergamasco et al. |
| 5,721,783 A | 2/1998 | Anderson |
| 5,724,619 A | 3/1998 | Hamada et al. |
| 5,729,289 A | 3/1998 | Etoh |
| 5,729,659 A | 3/1998 | Potter |
| 5,734,425 A | 3/1998 | Takizawa et al. |
| D393,808 S | 4/1998 | Lindsey et al. |
| 5,737,491 A | 4/1998 | Allen et al. |
| 5,740,484 A | 4/1998 | Miyazaki et al. |
| 5,742,233 A | 4/1998 | Hoffman et al. |
| 5,745,717 A | 4/1998 | Vayda et al. |
| 5,745,810 A | 4/1998 | Masushima |
| 5,748,992 A | 5/1998 | Tsukahara et al. |
| 5,749,000 A | 5/1998 | Narisawa |
| 5,749,324 A | 5/1998 | Moore |
| 5,751,260 A | 5/1998 | Miller et al. |
| 5,752,094 A | 5/1998 | Tsutsumi et al. |
| 5,757,428 A | 5/1998 | Takei |
| 5,760,917 A | 6/1998 | Sheridan |
| 5,765,045 A | 6/1998 | Takagi et al. |
| 5,771,414 A | 6/1998 | Bowen |
| 5,771,511 A | 6/1998 | Kummer et al. |
| 5,774,754 A | 6/1998 | Ootsuka |
| 5,774,851 A | 6/1998 | Miyashiba et al. |
| 5,779,483 A | 7/1998 | Cho |
| 5,788,688 A | 8/1998 | Bauer et al. |
| 5,797,046 A | 8/1998 | Nagano et al. |
| 5,797,122 A | 8/1998 | Spies |
| 5,805,251 A | 9/1998 | Ozawa |
| 5,809,591 A | 9/1998 | Capaldi et al. |
| 5,812,978 A | 9/1998 | Nolan |
| 5,815,750 A | 9/1998 | Ishiguro |
| 5,819,183 A | 10/1998 | Voroba et al. |
| 5,828,376 A | 10/1998 | Solimene et al. |
| 5,829,782 A | 11/1998 | Breed et al. |
| 5,832,077 A | 11/1998 | Ciurpita |
| 5,832,440 A | 11/1998 | Woodbridge et al. |
| 5,841,950 A | 11/1998 | Wang et al. |
| 5,844,599 A | 12/1998 | Hildin |
| 5,848,146 A | 12/1998 | Slattery |
| 5,850,058 A | 12/1998 | Tano et al. |
| 5,850,211 A | 12/1998 | Tognazzini |
| 5,850,218 A | 12/1998 | LaJoie et al. |
| 5,855,000 A | 12/1998 | Waibel et al. |
| 5,867,817 A | 2/1999 | Catalo et al. |
| 5,870,709 A | 2/1999 | Bernstein |
| 5,871,589 A | 2/1999 | Hedge |
| 5,874,947 A | 2/1999 | Lin |
| 5,875,108 A | 2/1999 | Hoffberg et al. |
| 5,877,772 A | 3/1999 | Nomura et al. |
| 5,877,803 A | 3/1999 | Wee et al. |
| 5,877,809 A | 3/1999 | Omata et al. |
| 5,878,922 A | 3/1999 | Boring |
| 5,884,265 A | 3/1999 | Squitteri et al. |
| 5,884,350 A | 3/1999 | Kurze |
| 5,893,037 A | 4/1999 | Reele et al. |
| 5,897,228 A * | 4/1999 | Schrock .......... G03B 17/24 396/297 |
| 5,897,232 A | 4/1999 | Stephenson et al. |
| 5,898,779 A | 4/1999 | Squilla et al. |
| 5,903,864 A | 5/1999 | Gadbois et al. |
| 5,903,870 A | 5/1999 | Kaufman |
| 5,907,723 A | 5/1999 | Inoue |
| 5,911,687 A | 6/1999 | Sato et al. |
| 5,913,080 A | 6/1999 | Yamada et al. |
| 5,913,727 A | 6/1999 | Ahdoot |
| 5,917,921 A | 6/1999 | Sasaki |
| 5,920,350 A | 7/1999 | Keirsbilck |
| 5,923,908 A | 7/1999 | Schrock et al. |
| 5,926,655 A | 7/1999 | Irie et al. |
| 5,930,533 A | 7/1999 | Yamamoto |
| 5,930,746 A | 7/1999 | Ting |
| 5,933,125 A | 8/1999 | Fernie et al. |
| 5,940,121 A | 8/1999 | McIntyre et al. |
| 5,943,516 A | 8/1999 | Uchiyama et al. |
| 5,959,667 A | 9/1999 | Maeng |
| 5,970,258 A | 10/1999 | Suda et al. |
| 5,970,457 A | 10/1999 | Brant et al. |
| 5,980,124 A | 11/1999 | Bernardi et al. |
| 5,980,256 A | 11/1999 | Carmein |
| 5,982,555 A | 11/1999 | Melville et al. |
| 5,983,186 A | 11/1999 | Miyazawa et al. |
| 5,989,157 A | 11/1999 | Walton |
| 5,991,385 A | 11/1999 | Dunn et al. |
| 5,991,720 A | 11/1999 | Galler et al. |
| 5,991,726 A | 11/1999 | Immarco et al. |
| 5,995,649 A | 11/1999 | Marugame |
| 5,995,931 A | 11/1999 | Bahl et al. |
| 5,995,936 A | 11/1999 | Brais et al. |
| 6,003,004 A | 12/1999 | Hershkovits et al. |
| 6,003,991 A | 12/1999 | Virre |
| 6,004,061 A | 12/1999 | Manico et al. |
| 6,005,548 A | 12/1999 | Latypov et al. |
| 6,005,610 A | 12/1999 | Pingali |
| 6,006,126 A | 12/1999 | Cosman |
| 6,006,187 A | 12/1999 | Tanenblatt |
| 6,009,210 A | 12/1999 | Kang |
| 6,012,029 A | 1/2000 | Cirino et al. |
| 6,012,102 A | 1/2000 | Shachar |
| 6,014,524 A | 1/2000 | Suzuki et al. |
| 6,016,450 A | 1/2000 | Crock |
| 6,021,278 A | 2/2000 | Bernardi et al. |
| 6,021,418 A | 2/2000 | Brandt et al. |
| 6,027,216 A | 2/2000 | Guyton et al. |
| 6,031,526 A | 2/2000 | Shipp |
| 6,040,824 A | 3/2000 | Maekawa et al. |
| 6,049,766 A | 4/2000 | Laroche |
| 6,050,963 A | 4/2000 | Johnson et al. |
| 6,054,990 A | 4/2000 | Tran |

(56) References Cited

U.S. PATENT DOCUMENTS

| | | |
|---|---|---|
| 6,054,991 A | 4/2000 | Crane et al. |
| 6,066,075 A | 5/2000 | Poulton |
| 6,067,112 A | 5/2000 | Wellner et al. |
| 6,070,140 A | 5/2000 | Tran |
| 6,072,494 A | 6/2000 | Nguyen |
| 6,073,489 A | 6/2000 | French et al. |
| 6,077,085 A | 6/2000 | Parry et al. |
| 6,077,201 A | 6/2000 | Cheng |
| 6,078,886 A | 6/2000 | Dragosh et al. |
| 6,081,670 A | 6/2000 | Madsen et al. |
| 6,085,160 A | 7/2000 | D'hoore et al. |
| 6,088,669 A | 7/2000 | Maes |
| 6,091,334 A | 7/2000 | Galiana |
| 6,098,458 A | 8/2000 | French et al. |
| 6,099,473 A | 8/2000 | Liu et al. |
| 6,100,896 A | 8/2000 | Strohecker et al. |
| 6,101,115 A | 8/2000 | Ross |
| 6,101,258 A | 8/2000 | Killion et al. |
| 6,101,289 A | 8/2000 | Kellner |
| 6,101,338 A | 8/2000 | Bernardi et al. |
| 6,104,877 A | 8/2000 | Smart et al. |
| 6,111,580 A | 8/2000 | Fukui et al. |
| 6,115,482 A | 9/2000 | Goldberg et al. |
| 6,115,556 A | 9/2000 | Reddington |
| 6,115,668 A | 9/2000 | Kaneko et al. |
| 6,118,888 A | 9/2000 | Chino et al. |
| 6,128,003 A | 10/2000 | Smith et al. |
| 6,128,446 A | 10/2000 | Schrock et al. |
| 6,130,677 A | 10/2000 | Kunz |
| 6,130,741 A | 10/2000 | Wen et al. |
| 6,134,392 A | 10/2000 | Gove |
| 6,137,487 A | 10/2000 | Mantha |
| 6,137,887 A | 10/2000 | Anderson |
| 6,138,091 A | 10/2000 | Haataja et al. |
| 6,141,463 A | 10/2000 | Covell et al. |
| 6,144,807 A | 11/2000 | Smart et al. |
| 6,147,678 A | 11/2000 | Kumar et al. |
| 6,147,711 A | 11/2000 | Washio |
| 6,147,744 A | 11/2000 | Smart et al. |
| 6,148,154 A | 11/2000 | Ishimaru et al. |
| 6,152,856 A | 11/2000 | Studor et al. |
| 6,159,100 A | 12/2000 | Smith |
| 6,160,540 A | 12/2000 | Fishkin et al. |
| 6,161,932 A | 12/2000 | Goto et al. |
| 6,163,652 A | 12/2000 | Sato |
| 6,167,469 A | 12/2000 | Safai et al. |
| 6,169,854 B1 | 1/2001 | Hasegawa et al. |
| 6,173,059 B1 | 1/2001 | Huang et al. |
| 6,173,066 B1 | 1/2001 | Peurach et al. |
| 6,181,343 B1 | 1/2001 | Lyons |
| 6,181,377 B1 | 1/2001 | Kobayashi |
| 6,181,883 B1 | 1/2001 | Oswal |
| 6,185,371 B1 | 2/2001 | Smart et al. |
| 6,188,777 B1 | 2/2001 | Darrell et al. |
| 6,192,193 B1 | 2/2001 | Smart et al. |
| 6,192,343 B1 | 2/2001 | Morgan et al. |
| 6,201,931 B1 | 3/2001 | Cipolla et al. |
| 6,204,877 B1 | 3/2001 | Kiyokawa |
| 6,215,471 B1 | 4/2001 | Deluca |
| 6,215,890 B1 | 4/2001 | Matsuo et al. |
| 6,215,898 B1 | 4/2001 | Woodfill et al. |
| 6,222,993 B1 | 4/2001 | Smart et al. |
| 6,224,542 B1 | 5/2001 | Chang et al. |
| 6,226,396 B1 | 5/2001 | Marugame |
| 6,229,913 B1 | 5/2001 | Nayar et al. |
| 6,230,138 B1 | 5/2001 | Everhart |
| 6,240,251 B1 | 5/2001 | Smart et al. |
| 6,243,076 B1 | 6/2001 | Hatfield |
| 6,243,683 B1 | 6/2001 | Peters et al. |
| 6,244,873 B1 | 6/2001 | Hill et al. |
| 6,249,316 B1 | 6/2001 | Anderson |
| 6,253,184 B1 | 6/2001 | Ruppert |
| 6,256,060 B1 | 7/2001 | Wakui |
| 6,256,400 B1 | 7/2001 | Takata et al. |
| 6,259,436 B1 | 7/2001 | Moon et al. |
| 6,266,635 B1 | 7/2001 | Sneh |
| 6,272,287 B1 | 8/2001 | Cipola et al. |
| 6,275,656 B1 | 8/2001 | Cipola et al. |
| 6,278,973 B1 | 8/2001 | Chung et al. |
| 6,279,946 B1 | 8/2001 | Johnson et al. |
| 6,282,317 B1 | 8/2001 | Luo et al. |
| 6,283,860 B1 | 9/2001 | Lyons et al. |
| 6,287,252 B1 | 9/2001 | Lugo |
| 6,289,112 B1 | 9/2001 | Jain et al. |
| 6,289,140 B1 | 9/2001 | Oliver |
| 6,294,993 B1 | 9/2001 | Calaman |
| 6,299,308 B1 | 10/2001 | Voronka et al. |
| 6,304,841 B1 | 10/2001 | Berger et al. |
| 6,308,565 B1 | 10/2001 | French et al. |
| 6,311,156 B1 | 10/2001 | Ho |
| 6,313,864 B1 | 11/2001 | Tabata et al. |
| 6,316,934 B1 | 11/2001 | Amorai-Moriya et al. |
| 6,317,717 B1 | 11/2001 | Lindsey et al. |
| 6,321,040 B1 | 11/2001 | Wess et al. |
| 6,323,858 B1 | 11/2001 | Gilbert et al. |
| 6,324,545 B1 | 11/2001 | Morag |
| 6,327,423 B1 | 12/2001 | Ejima et al. |
| 6,339,429 B1 | 1/2002 | Schug |
| 6,344,875 B1 | 2/2002 | Hashimoto et al. |
| 6,345,111 B1 | 2/2002 | Fukui et al. |
| 6,349,001 B1 | 2/2002 | Spitzer |
| 6,351,222 B1 | 2/2002 | Henry et al. |
| 6,351,273 B1 | 2/2002 | Lemelson et al. |
| 6,359,837 B1 | 3/2002 | Tsukamoto |
| 6,363,160 B1 | 3/2002 | Bradski et al. |
| 6,366,319 B1 | 4/2002 | Bills |
| 6,373,961 B1 | 4/2002 | Richardson et al. |
| 6,377,923 B1 | 4/2002 | Hershkovits et al. |
| 6,381,316 B2 | 4/2002 | Joyce et al. |
| 6,381,412 B1 | 4/2002 | Ishito et al. |
| 6,384,819 B1 | 5/2002 | Hunter |
| 6,388,681 B1 | 5/2002 | Nozaki |
| 6,388,707 B1 | 5/2002 | Suda |
| 6,389,395 B1 | 5/2002 | Ringland |
| 6,392,249 B1 | 5/2002 | Struye et al. |
| 6,393,216 B1 | 5/2002 | Ootsuka et al. |
| 6,394,602 B1 | 5/2002 | Morrison et al. |
| 6,405,939 B1 | 6/2002 | Mazzenga et al. |
| 6,406,758 B1 | 6/2002 | Bottari et al. |
| 6,408,138 B1 | 6/2002 | Chang et al. |
| 6,408,301 B1 | 6/2002 | Patton et al. |
| 6,411,744 B1 | 6/2002 | Edwards |
| 6,411,925 B1 | 6/2002 | Keiller |
| 6,424,843 B1 | 7/2002 | Jyrki et al. |
| 6,426,740 B1 | 7/2002 | Goto et al. |
| 6,426,761 B1 | 7/2002 | Kanevsky et al. |
| 6,430,551 B1 | 8/2002 | Thelen et al. |
| 6,430,997 B1 | 8/2002 | French et al. |
| 6,434,255 B1 | 8/2002 | Harakawa |
| 6,434,403 B1 | 8/2002 | Ausems et al. |
| 6,438,323 B1 | 8/2002 | DeCecca et al. |
| 6,438,520 B1 | 8/2002 | Curt et al. |
| 6,452,348 B1 | 9/2002 | Toyoda |
| 6,452,544 B1 | 9/2002 | Hakala et al. |
| 6,456,788 B1 | 9/2002 | Otani |
| 6,456,892 B1 | 9/2002 | Dara-Abrams et al. |
| 6,466,688 B1 | 10/2002 | Ramstack |
| 6,476,834 B1 | 11/2002 | Doval et al. |
| 6,496,598 B1 | 12/2002 | Harman |
| 6,498,628 B2 | 12/2002 | Iwamura |
| 6,499,016 B1 | 12/2002 | Anderson |
| 6,503,195 B1 | 1/2003 | Keller et al. |
| 6,504,552 B2 | 1/2003 | Phillips |
| 6,510,414 B1 | 1/2003 | Chaves |
| 6,526,352 B1 | 2/2003 | Breed et al. |
| 6,529,802 B1 | 3/2003 | Kawakita et al. |
| 6,531,999 B1 | 3/2003 | Trajkovic |
| 6,535,694 B2 | 3/2003 | Engle et al. |
| 6,538,697 B1 | 3/2003 | Honda et al. |
| 6,539,931 B2 | 4/2003 | Trajkovic et al. |
| 6,549,586 B2 | 4/2003 | Gustafsson et al. |
| 6,549,629 B2 | 4/2003 | Finn et al. |
| 6,556,240 B2 | 4/2003 | Oka et al. |
| 6,556,784 B2 | 4/2003 | Onuki |

(56) References Cited

U.S. PATENT DOCUMENTS

| | | |
|---|---|---|
| 6,560,027 B2 | 5/2003 | Meine |
| 6,563,532 B1 | 5/2003 | Strub et al. |
| 6,570,555 B1 | 5/2003 | Prevost et al. |
| 6,584,221 B1 | 6/2003 | Moghaddam et al. |
| 6,591,239 B1 | 7/2003 | McCall |
| 6,593,956 B1 | 7/2003 | Potts et al. |
| 6,594,629 B1 | 7/2003 | Basu et al. |
| 6,603,858 B1 | 8/2003 | Raicevich et al. |
| 6,606,280 B1 | 8/2003 | Knittel |
| 6,608,615 B1 | 8/2003 | Martins |
| 6,611,456 B2 | 8/2003 | Kushnarenko |
| 6,611,661 B2 | 8/2003 | Buck |
| 6,629,642 B1 | 10/2003 | Swartz et al. |
| 6,633,231 B1 | 10/2003 | Okamoto et al. |
| 6,633,294 B1 | 10/2003 | Rosenthal et al. |
| 6,636,259 B1 | 10/2003 | Anderson |
| 6,637,883 B1 | 10/2003 | Tengshe et al. |
| 6,640,202 B1 | 10/2003 | Dietz et al. |
| 6,654,721 B2 | 11/2003 | Handelman |
| 6,658,389 B1 | 12/2003 | Alpdemir |
| 6,658,572 B1 | 12/2003 | Craig |
| 6,661,918 B1 | 12/2003 | Gordon et al. |
| 6,674,964 B2 | 1/2004 | Irie |
| 6,675,075 B1 | 1/2004 | Engelsberg et al. |
| 6,678,398 B2 | 1/2004 | Wolters et al. |
| 6,681,031 B2 | 1/2004 | Cohen et al. |
| 6,686,844 B2 | 2/2004 | Murase et al. |
| 6,690,374 B2 | 2/2004 | Park et al. |
| 6,691,151 B1 | 2/2004 | Cheyer et al. |
| 6,704,044 B1 | 3/2004 | Foster et al. |
| 6,704,415 B1 | 3/2004 | Katayama et al. |
| 6,704,422 B1 | 3/2004 | Jensen |
| 6,707,475 B1 | 3/2004 | Snyder |
| 6,711,536 B2 | 3/2004 | Rees |
| 6,714,205 B1 | 3/2004 | Miyashita et al. |
| 6,714,665 B1 | 3/2004 | Hanna et al. |
| 6,715,003 B1 | 3/2004 | Safai |
| 6,717,600 B2 | 4/2004 | Dutta et al. |
| 6,721,001 B1 | 4/2004 | Berstis |
| 6,724,873 B2 | 4/2004 | Senna Da Silva |
| 6,731,799 B1 | 5/2004 | Sun et al. |
| 6,735,562 B1 | 5/2004 | Zhang et al. |
| 6,738,066 B1 | 5/2004 | Nguyen |
| 6,741,266 B1 | 5/2004 | Kamiwada et al. |
| 6,746,397 B2 | 6/2004 | Lee et al. |
| 6,750,913 B1 | 6/2004 | Noro et al. |
| 6,754,373 B1 | 6/2004 | Cuetos et al. |
| 6,757,657 B1 | 6/2004 | Kojima et al. |
| 6,758,563 B2 | 7/2004 | Levola |
| 6,763,226 B1 | 7/2004 | McZeal, Jr. |
| 6,766,036 B1 | 7/2004 | Pryor |
| 6,766,176 B1 | 7/2004 | Gupta et al. |
| 6,771,294 B1 | 8/2004 | Antoniac et al. |
| 6,788,809 B1 | 9/2004 | Grzeszczuk et al. |
| 6,793,128 B2 | 9/2004 | Huffman |
| 6,795,558 B2 | 9/2004 | Matsuo |
| 6,795,806 B1 | 9/2004 | Lewis et al. |
| 6,798,890 B2 | 9/2004 | Killion et al. |
| 6,801,637 B2 | 10/2004 | Voronka et al. |
| 6,802,382 B2 | 10/2004 | Hattori et al. |
| 6,803,887 B1 | 10/2004 | Lauper et al. |
| 6,804,396 B2 | 10/2004 | Higaki et al. |
| 6,807,529 B2 | 10/2004 | Johnson et al. |
| 6,809,759 B1 | 10/2004 | Chiang |
| 6,812,956 B2 | 11/2004 | Ferren et al. |
| 6,812,968 B1 | 11/2004 | Kermani |
| 6,813,439 B2 | 11/2004 | Misumi et al. |
| 6,813,603 B1 | 11/2004 | Groner et al. |
| 6,813,618 B1 | 11/2004 | Loui et al. |
| 6,817,982 B2 | 11/2004 | Fritz et al. |
| 6,821,034 B2 | 11/2004 | Ohmura |
| 6,825,769 B2 | 11/2004 | Colmenarez et al. |
| 6,833,867 B1 | 12/2004 | Anderson |
| 6,842,175 B1 | 1/2005 | Schmalstieg et al. |
| 6,842,670 B2 | 1/2005 | Lin et al. |
| 6,847,336 B1 | 1/2005 | Lemelson et al. |
| 6,853,401 B2 | 2/2005 | Fujii et al. |
| 6,853,972 B2 | 2/2005 | Friedrich et al. |
| 6,856,708 B1 | 2/2005 | Aoki |
| 6,867,798 B1 | 3/2005 | Wada et al. |
| 6,873,723 B1 | 3/2005 | Aucsmith et al. |
| 6,882,734 B2 | 4/2005 | Watson et al. |
| 6,882,971 B2 | 4/2005 | Craner |
| 6,900,731 B2 | 5/2005 | Kreiner et al. |
| 6,911,972 B2 | 6/2005 | Brinjes |
| 6,912,499 B1 | 6/2005 | Sabourin et al. |
| 6,919,927 B1 | 7/2005 | Hyodo |
| 6,920,283 B2 | 7/2005 | Goldstein |
| 6,920,654 B2 | 7/2005 | Noguchi et al. |
| 6,927,694 B1 | 8/2005 | Smith |
| 6,934,461 B1 | 8/2005 | Strub et al. |
| 6,934,684 B2 | 8/2005 | Alpdemir et al. |
| 6,937,742 B2 | 8/2005 | Roberts et al. |
| 6,940,545 B1 | 9/2005 | Ray et al. |
| 6,947,029 B2 | 9/2005 | Akasaka et al. |
| 6,948,937 B2 | 9/2005 | Tretiakoff et al. |
| 6,950,534 B2 | 9/2005 | Cohen et al. |
| 6,952,525 B2 | 10/2005 | Lee et al. |
| 6,956,616 B2 | 10/2005 | Jung et al. |
| 6,959,095 B2 | 10/2005 | Bakis et al. |
| 6,964,023 B2 | 11/2005 | Maes et al. |
| 6,965,403 B2 | 11/2005 | Endo |
| 6,970,185 B2 | 11/2005 | Halverson |
| 6,970,824 B2 | 11/2005 | Hinde et al. |
| 6,971,072 B1 | 11/2005 | Stein |
| 6,975,991 B2 | 12/2005 | Basson et al. |
| 6,983,245 B1 | 1/2006 | Jimenez Felstrom et al. |
| 6,990,455 B2 | 1/2006 | Vozick et al. |
| 6,993,482 B2 | 1/2006 | Ahlenius |
| 6,999,066 B2 | 2/2006 | Litwiller |
| 7,003,134 B1 | 2/2006 | Cowell et al. |
| 7,006,764 B2 | 2/2006 | Brost |
| 7,010,263 B1 | 3/2006 | Patsiokas |
| 7,015,950 B1 | 3/2006 | Pryor |
| 7,016,505 B1 | 3/2006 | Nakadai et al. |
| 7,016,604 B2 | 3/2006 | Stavely et al. |
| 7,020,290 B1 | 3/2006 | Ribic |
| 7,027,094 B2 | 4/2006 | Battles et al. |
| 7,027,565 B2 | 4/2006 | Tateishi et al. |
| 7,028,269 B1 | 4/2006 | Cohen et al. |
| 7,031,439 B2 | 4/2006 | Baxter |
| 7,031,477 B1 | 4/2006 | Mella et al. |
| 7,032,182 B2 | 4/2006 | Prabhu et al. |
| 7,036,094 B1 | 4/2006 | Cohen et al. |
| 7,039,676 B1 | 5/2006 | Day et al. |
| 7,042,440 B2 | 5/2006 | Pryor et al. |
| 7,046,232 B2 | 5/2006 | Gomi et al. |
| 7,046,300 B2 | 5/2006 | Iyengar et al. |
| 7,046,924 B2 | 5/2006 | Miller et al. |
| 7,050,606 B2 | 5/2006 | Paul et al. |
| 7,053,938 B1 | 5/2006 | Sherry |
| 7,058,204 B2 | 6/2006 | Hildreth et al. |
| 7,058,409 B2 | 6/2006 | Hänninen et al. |
| 7,060,957 B2 | 6/2006 | Lange et al. |
| 7,062,576 B2 | 6/2006 | Ohmura et al. |
| 7,075,579 B2 | 7/2006 | Whitby et al. |
| 7,076,293 B2 | 7/2006 | Wang |
| 7,080,014 B2 | 7/2006 | Bush et al. |
| 7,082,393 B2 | 7/2006 | Lahr |
| 7,084,859 B1 | 8/2006 | Pryor |
| 7,085,590 B2 | 8/2006 | Bates et al. |
| 7,091,928 B2 | 8/2006 | Rajasingham |
| 7,092,024 B2 | 8/2006 | Ejima et al. |
| 7,095,901 B2 | 8/2006 | Lee et al. |
| 7,095,907 B1 | 8/2006 | Berkner et al. |
| 7,099,920 B1 | 8/2006 | Kojima et al. |
| 7,107,378 B1 | 9/2006 | Brewer et al. |
| 7,110,553 B1 | 9/2006 | Julstrom et al. |
| 7,110,582 B1 | 9/2006 | Hay |
| 7,112,841 B2 | 9/2006 | Eldridge et al. |
| 7,113,201 B1 | 9/2006 | Taylor et al. |
| 7,113,918 B1 | 9/2006 | Ahmad et al. |
| 7,114,659 B2 | 10/2006 | Harari et al. |
| 7,117,519 B1 | 10/2006 | Anderson et al. |

(56) References Cited

U.S. PATENT DOCUMENTS

| | | | |
|---|---|---|---|
| 7,120,586 B2 | 10/2006 | Loui et al. |
| 7,121,946 B2 | 10/2006 | Paul et al. |
| 7,122,798 B2 | 10/2006 | Shigenaka et al. |
| 7,127,401 B2 | 10/2006 | Miller |
| 7,133,031 B2 | 11/2006 | Wang et al. |
| 7,133,608 B1 | 11/2006 | Nagata et al. |
| 7,133,937 B2 | 11/2006 | Leavitt |
| 7,134,078 B2 | 11/2006 | Vaarala |
| 7,142,197 B2 | 11/2006 | Wang et al. |
| 7,142,231 B2 | 11/2006 | Chipchase et al. |
| 7,142,678 B2 | 11/2006 | Falcon |
| 7,149,552 B2 | 12/2006 | Lair |
| 7,149,688 B2 | 12/2006 | Schalkwyk |
| 7,149,814 B2 | 12/2006 | Neufeld et al. |
| 7,156,866 B1 | 1/2007 | Riggs et al. |
| 7,158,123 B2 | 1/2007 | Myers et al. |
| 7,158,175 B2 | 1/2007 | Belz et al. |
| 7,163,151 B2 | 1/2007 | Kiiskinen |
| 7,164,117 B2 | 1/2007 | Breed |
| 7,167,201 B2 | 1/2007 | Stavely et al. |
| 7,168,804 B2 | 1/2007 | Velazquez |
| 7,170,492 B2 | 1/2007 | Bell |
| 7,173,722 B1 | 2/2007 | Lapstun et al. |
| 7,184,573 B2 | 2/2007 | Malone et al. |
| 7,187,412 B1 | 3/2007 | Silverstein |
| 7,187,764 B2 | 3/2007 | Ruetschi |
| 7,190,825 B2 | 3/2007 | Yoon |
| 7,194,412 B2 | 3/2007 | Mays |
| 7,202,898 B1 | 4/2007 | Braun et al. |
| 7,206,022 B2 | 4/2007 | Miller et al. |
| 7,209,995 B2 | 4/2007 | Pinto et al. |
| 7,218,311 B2 | 5/2007 | Akins |
| 7,219,062 B2 | 5/2007 | Colmenarez et al. |
| 7,221,805 B1 | 5/2007 | Bachelder |
| 7,222,078 B2 | 5/2007 | Abelow |
| 7,227,526 B2 | 6/2007 | Hildreth et al. |
| 7,227,960 B2 | 6/2007 | Kataoka |
| 7,228,275 B1 | 6/2007 | Endo et al. |
| 7,233,345 B2 | 6/2007 | Yoneda |
| 7,245,271 B2 | 7/2007 | Burr et al. |
| 7,247,139 B2 | 7/2007 | Yudkovitch et al. |
| 7,248,855 B2 | 7/2007 | Joyce et al. |
| 7,257,831 B1 | 8/2007 | Ozawa |
| 7,259,747 B2 | 8/2007 | Bell |
| 7,259,785 B2 | 8/2007 | Stavely et al. |
| 7,263,953 B2 | 9/2007 | Sundararajan |
| 7,271,827 B2 | 9/2007 | Nister |
| 7,272,562 B2 | 9/2007 | Olorenshaw et al. |
| 7,274,808 B2 | 9/2007 | Ang et al. |
| 7,283,854 B2 | 10/2007 | Sato et al. |
| 7,283,983 B2 | 10/2007 | Dooley et al. |
| 7,286,256 B2 | 10/2007 | Herbert |
| 7,287,737 B2 | 10/2007 | Rossi |
| 7,295,978 B1 | 11/2007 | Schwartz et al. |
| 7,299,177 B2 | 11/2007 | Broman et al. |
| 7,301,465 B2 | 11/2007 | Tengshe et al. |
| 7,305,344 B2 | 12/2007 | Glynn et al. |
| 7,305,535 B2 | 12/2007 | Harari et al. |
| 7,307,653 B2 | 12/2007 | Dutta |
| 7,308,112 B2 | 12/2007 | Fujimura et al. |
| 7,315,323 B2 | 1/2008 | Ito |
| 7,317,836 B2 | 1/2008 | Fujimura et al. |
| 7,319,962 B2 | 1/2008 | Goedeke et al. |
| 7,321,763 B2 | 1/2008 | Tanaka et al. |
| 7,321,853 B2 | 1/2008 | Asano |
| 7,324,649 B1 | 1/2008 | Knapp et al. |
| 7,324,943 B2 | 1/2008 | Rigazio et al. |
| 7,327,890 B2 | 2/2008 | Fredlund |
| 7,340,766 B2 | 3/2008 | Nagao |
| 7,346,176 B1 | 3/2008 | Bernardi et al. |
| 7,346,374 B2 | 3/2008 | Witkowski et al. |
| 7,347,551 B2 | 3/2008 | Fergason et al. |
| 7,348,963 B2 | 3/2008 | Bell |
| 7,349,722 B2 | 3/2008 | Witkowski et al. |
| 7,362,490 B2 | 4/2008 | Park |
| 7,362,966 B2 | 4/2008 | Uchiyama |
| 7,366,540 B2 | 4/2008 | Ansari et al. |
| 7,367,887 B2 | 5/2008 | Watabe et al. |
| 7,373,389 B2 | 5/2008 | Rosenbaum et al. |
| 7,376,290 B2 | 5/2008 | Anderson et al. |
| 7,379,563 B2 | 5/2008 | Shamaie |
| 7,379,566 B2 | 5/2008 | Hildreth |
| 7,385,641 B2 | 6/2008 | Ito |
| 7,389,591 B2 | 6/2008 | Jaiswal et al. |
| 7,394,480 B2 | 7/2008 | Song |
| 7,394,543 B2 | 7/2008 | Crowther |
| 7,400,347 B2 | 7/2008 | Krogmann et al. |
| 7,403,816 B2 | 7/2008 | Ohkura |
| 7,405,754 B2 | 7/2008 | Inoue |
| 7,406,408 B1 | 7/2008 | Lackey et al. |
| 7,408,439 B2 | 8/2008 | Wang et al. |
| 7,415,116 B1 | 8/2008 | Rees |
| 7,417,683 B2 | 8/2008 | Hirai |
| 7,428,000 B2 | 9/2008 | Cutler et al. |
| 7,428,708 B2 | 9/2008 | Okamoto et al. |
| 7,430,312 B2 | 9/2008 | Gu |
| 7,430,503 B1 | 9/2008 | Walker |
| 7,436,496 B2 | 10/2008 | Kawahito |
| 7,437,488 B2 | 10/2008 | Ito et al. |
| 7,438,414 B2 | 10/2008 | Rosenberg |
| 7,440,013 B2 | 10/2008 | Funakura |
| 7,443,419 B2 | 10/2008 | Anderson et al. |
| 7,443,447 B2 | 10/2008 | Shirakawa |
| 7,444,068 B2 | 10/2008 | Obrador |
| 7,444,340 B2 | 10/2008 | Padgett |
| 7,446,368 B2 | 11/2008 | Eldridge et al. |
| 7,447,320 B2 | 11/2008 | Bryson et al. |
| 7,447,635 B1 | 11/2008 | Konopka et al. |
| 7,448,751 B2 | 11/2008 | Kiderman et al. |
| 7,452,275 B2 | 11/2008 | Kuraishi |
| 7,453,605 B2 | 11/2008 | Parulski et al. |
| 7,455,412 B2 | 11/2008 | Rottcher |
| 7,461,094 B2 | 12/2008 | Morris et al. |
| 7,463,304 B2 | 12/2008 | Murray |
| 7,468,744 B2 | 12/2008 | Edwards et al. |
| 7,471,317 B2 | 12/2008 | Seki |
| 7,477,207 B2 | 1/2009 | Estep |
| 7,479,943 B1 * | 1/2009 | Lunsford ............ G06F 3/04886 |
| | | 345/157 |
| 7,483,057 B2 | 1/2009 | Grosvenor et al. |
| 7,483,061 B2 | 1/2009 | Fredlund et al. |
| 7,489,812 B2 | 2/2009 | Fox et al. |
| 7,492,116 B2 | 2/2009 | Oleynikov et al. |
| 7,493,312 B2 | 2/2009 | Liu et al. |
| 7,493,559 B1 | 2/2009 | Wolff et al. |
| 7,499,642 B2 | 3/2009 | Nakaya |
| 7,502,731 B2 | 3/2009 | Emonts et al. |
| 7,503,065 B1 | 3/2009 | Packingham et al. |
| 7,505,056 B2 | 3/2009 | Kurzweil et al. |
| 7,511,741 B2 | 3/2009 | Son |
| 7,515,193 B2 | 4/2009 | Honda |
| 7,515,825 B2 | 4/2009 | Takashi |
| 7,518,631 B2 | 4/2009 | Hershey et al. |
| 7,518,641 B2 | 4/2009 | Mashitani et al. |
| 7,522,065 B2 | 4/2009 | Falcon |
| 7,526,314 B2 | 4/2009 | Kennedy |
| 7,526,735 B2 | 4/2009 | Fischer et al. |
| 7,528,846 B2 | 5/2009 | Zhang et al. |
| 7,529,772 B2 | 5/2009 | Singh |
| 7,536,032 B2 | 5/2009 | Bell |
| 7,539,353 B2 | 5/2009 | Kawada |
| 7,548,255 B2 | 6/2009 | Adams et al. |
| 7,551,354 B2 | 6/2009 | Horsten et al. |
| 7,557,850 B2 | 7/2009 | Abe |
| 7,560,701 B2 | 7/2009 | Oggier et al. |
| 7,561,143 B1 | 7/2009 | Milekic |
| 7,561,201 B2 | 7/2009 | Hong |
| 7,561,741 B2 | 7/2009 | Lee et al. |
| 7,570,884 B2 | 8/2009 | Nonaka |
| 7,574,020 B2 | 8/2009 | Shamaie |
| 7,576,727 B2 | 8/2009 | Bell |
| 7,580,570 B2 | 8/2009 | Manu et al. |
| 7,583,316 B2 | 9/2009 | Miyashita et al. |
| 7,583,441 B2 | 9/2009 | Taki |

(56) References Cited

U.S. PATENT DOCUMENTS

| | | |
|---|---|---|
| 7,587,318 B2 | 9/2009 | Seshadri |
| 7,590,262 B2 | 9/2009 | Fujimura et al. |
| 7,593,552 B2 | 9/2009 | Higaki et al. |
| 7,593,854 B2 | 9/2009 | Belrose |
| 7,598,942 B2 | 10/2009 | Underkoffler et al. |
| 7,600,201 B2 | 10/2009 | Endler et al. |
| 7,607,509 B2 | 10/2009 | Schmiz et al. |
| 7,612,766 B2 | 11/2009 | Shintome |
| 7,617,108 B2 | 11/2009 | Matsubara et al. |
| 7,619,660 B2 | 11/2009 | Grosvenor |
| 7,620,202 B2 | 11/2009 | Fujimura et al. |
| 7,620,432 B2 | 11/2009 | Willins et al. |
| 7,629,400 B2 | 12/2009 | Hyman |
| 7,630,878 B2 | 12/2009 | Fingscheidt et al. |
| 7,643,985 B2 | 1/2010 | Horvitz |
| 7,646,193 B2 | 1/2010 | Yoshio et al. |
| 7,656,426 B2 | 2/2010 | Yamaya |
| 7,657,062 B2 | 2/2010 | Pilu |
| 7,672,512 B2 | 3/2010 | Cohen et al. |
| 7,680,287 B2 | 3/2010 | Amada et al. |
| 7,684,016 B1 | 3/2010 | Schaefer |
| 7,684,592 B2 | 3/2010 | Paul et al. |
| 7,684,982 B2 | 3/2010 | Taneda |
| 7,685,521 B1 | 3/2010 | Ueda et al. |
| 7,689,404 B2 | 3/2010 | Khasin |
| 7,693,720 B2 | 4/2010 | Kennewick et al. |
| 7,694,218 B2 | 4/2010 | Masuda et al. |
| 7,698,125 B2 | 4/2010 | Graehl et al. |
| 7,702,130 B2 | 4/2010 | Ho et al. |
| 7,702,516 B2 | 4/2010 | Fellenstein et al. |
| 7,702,821 B2 | 4/2010 | Feinberg et al. |
| 7,704,135 B2 | 4/2010 | Harrison, Jr. |
| 7,706,553 B2 | 4/2010 | Brown |
| 7,707,035 B2 | 4/2010 | McCune |
| 7,710,391 B2 | 5/2010 | Bell et al. |
| 7,714,880 B2 | 5/2010 | Johnson |
| 7,716,050 B2 | 5/2010 | Gillick et al. |
| 7,742,073 B1 | 6/2010 | Brodsky et al. |
| 7,760,191 B2 | 7/2010 | Cohen et al. |
| 7,761,297 B2 | 7/2010 | Lee |
| 7,764,290 B2 | 7/2010 | Fredlund et al. |
| 7,764,320 B1 | 7/2010 | Salvato |
| 7,772,796 B2 | 8/2010 | Farritor et al. |
| 7,778,438 B2 | 8/2010 | Malone |
| 7,782,365 B2 | 8/2010 | Levien et al. |
| 7,783,022 B1 | 8/2010 | Jay et al. |
| 7,783,063 B2 | 8/2010 | Pocino et al. |
| 7,809,197 B2 | 10/2010 | Fedorovskaya et al. |
| 7,809,570 B2 | 10/2010 | Kennewick et al. |
| 7,813,597 B2 | 10/2010 | Cohen et al. |
| 7,815,507 B2 | 10/2010 | Parrott et al. |
| 7,821,541 B2 | 10/2010 | Delean |
| 7,822,613 B2 | 10/2010 | Matsubara et al. |
| 7,843,495 B2 | 11/2010 | Aas et al. |
| 7,848,535 B2 | 12/2010 | Akino |
| 7,849,475 B2 | 12/2010 | Covell et al. |
| 7,853,050 B2 | 12/2010 | Wang et al. |
| 7,864,937 B2 | 1/2011 | Bathurst et al. |
| 7,869,578 B2 | 1/2011 | Evans et al. |
| 7,869,636 B2 | 1/2011 | Korotkov |
| 7,872,675 B2 | 1/2011 | Levien et al. |
| 7,876,334 B2 | 1/2011 | Bychkov et al. |
| 7,876,357 B2 | 1/2011 | Jung et al. |
| 7,884,849 B2 | 2/2011 | Yin et al. |
| 7,890,862 B2 | 2/2011 | Kompe et al. |
| 7,896,869 B2 | 3/2011 | DiSilvestro et al. |
| 7,898,563 B2 | 3/2011 | Park |
| 7,904,023 B2 | 3/2011 | Viitamäki |
| 7,907,199 B2 | 3/2011 | Seki et al. |
| 7,907,638 B2 | 3/2011 | Norhammar et al. |
| 7,908,629 B2 | 3/2011 | Lewis |
| 7,916,849 B2 | 3/2011 | Bathurst et al. |
| 7,917,367 B2 | 3/2011 | Cristo et al. |
| 7,920,102 B2 | 4/2011 | Breed |
| 7,920,169 B2 | 4/2011 | Jung et al. |
| 7,940,299 B2 | 5/2011 | Geng |
| 7,940,897 B2 | 5/2011 | Khor et al. |
| 7,942,816 B2 | 5/2011 | Satoh et al. |
| 7,949,529 B2 | 5/2011 | Weider et al. |
| 7,957,766 B2 | 6/2011 | Gong et al. |
| 7,960,935 B2 | 6/2011 | Farritor et al. |
| 7,983,917 B2 | 7/2011 | Kennewick et al. |
| 7,990,413 B2 | 8/2011 | Good |
| 8,023,998 B2 | 9/2011 | Croome |
| 8,031,853 B2 | 10/2011 | Bathurst et al. |
| 8,035,624 B2 | 10/2011 | Bell et al. |
| 8,036,893 B2 | 10/2011 | Reich |
| 8,037,229 B2 | 10/2011 | Zer et al. |
| 8,042,044 B2 | 10/2011 | Leeuwen |
| 8,045,050 B2 | 10/2011 | Nogo et al. |
| 8,046,504 B2 | 10/2011 | Feinberg et al. |
| 8,046,818 B2 | 10/2011 | Ngo |
| 8,059,921 B2 | 11/2011 | Frohlich et al. |
| 8,064,650 B2 | 11/2011 | Webb |
| 8,072,470 B2 | 12/2011 | Marks |
| 8,073,690 B2 | 12/2011 | Nakadai et al. |
| 8,085,994 B2 | 12/2011 | Kim |
| 8,094,212 B2 | 1/2012 | Jelinek |
| 8,102,383 B2 | 1/2012 | Cohen et al. |
| 8,106,066 B2 | 1/2012 | Schumacher et al. |
| 8,115,868 B2 | 2/2012 | Yang et al. |
| 8,117,623 B1 | 2/2012 | Malasky et al. |
| 8,125,444 B2 | 2/2012 | Noerager |
| 8,140,813 B2 | 3/2012 | Ozceri et al. |
| 8,165,341 B2 | 4/2012 | Rhoads |
| 8,175,883 B2 | 5/2012 | Grant et al. |
| 8,176,515 B2 | 5/2012 | Ahmad et al. |
| 8,213,633 B2 | 7/2012 | Kobayashi et al. |
| 8,214,196 B2 | 7/2012 | Yamada et al. |
| 8,224,776 B1 | 7/2012 | Anderson et al. |
| 8,226,011 B2 | 7/2012 | Merkli et al. |
| 8,229,252 B2 | 7/2012 | Cohen et al. |
| 8,232,979 B2 | 7/2012 | Cohen et al. |
| 8,234,106 B2 | 7/2012 | Marcu et al. |
| 8,237,809 B2 | 8/2012 | Mertens |
| 8,238,722 B2 | 8/2012 | Bhadkamkar et al. |
| 8,244,542 B2 | 8/2012 | Claudatos et al. |
| 8,290,313 B2 | 10/2012 | Cohen et al. |
| 8,296,127 B2 | 10/2012 | Marcu et al. |
| 8,332,224 B2 | 12/2012 | Di Cristo et al. |
| 8,339,420 B2 | 12/2012 | Hiraoka |
| 8,341,522 B2 | 12/2012 | Jung et al. |
| 8,345,105 B2 | 1/2013 | Fisher et al. |
| 8,350,683 B2 | 1/2013 | DeLine et al. |
| 8,350,946 B2 | 1/2013 | Jung et al. |
| 8,381,135 B2 | 2/2013 | Hotelling et al. |
| 8,384,668 B2 | 2/2013 | Barney et al. |
| 8,386,909 B2 | 2/2013 | Lin |
| 8,396,242 B2 | 3/2013 | Watanabe |
| 8,407,201 B2 | 3/2013 | Wu et al. |
| 8,429,244 B2 | 4/2013 | Naimark et al. |
| 8,457,614 B2 | 6/2013 | Bernard et al. |
| 8,460,103 B2 | 6/2013 | Mattice et al. |
| 8,467,672 B2 | 6/2013 | Konicek |
| 8,543,906 B2 | 9/2013 | Chidlovskii et al. |
| 8,548,794 B2 | 10/2013 | Koehn |
| 8,558,921 B2 | 10/2013 | Walker et al. |
| 8,571,851 B1 | 10/2013 | Tickner et al. |
| 8,582,831 B2 | 11/2013 | Miura |
| 8,587,514 B2 | 11/2013 | Lundström |
| 8,594,341 B2 | 11/2013 | Rothschild |
| 8,599,174 B2 | 12/2013 | Cohen et al. |
| 8,600,669 B2 | 12/2013 | Skarine |
| 8,600,728 B2 | 12/2013 | Knight et al. |
| 8,606,383 B2 | 12/2013 | Jung et al. |
| 8,614,760 B2 | 12/2013 | Nobels |
| 8,625,880 B2 | 1/2014 | Shillman et al. |
| 8,631,322 B2 | 1/2014 | Isomura et al. |
| 8,634,575 B2 | 1/2014 | Williams |
| 8,640,959 B2 | 2/2014 | Cohen et al. |
| 8,644,525 B2 | 2/2014 | Bathurst et al. |
| 8,645,325 B2 | 2/2014 | Anderson et al. |
| 8,661,333 B2 | 2/2014 | Matsuda et al. |
| 8,666,725 B2 | 3/2014 | Och |

(56) References Cited

U.S. PATENT DOCUMENTS

| | | |
|---|---|---|
| 8,668,584 B2 | 3/2014 | Wels |
| 8,670,632 B2 | 3/2014 | Wilson |
| 8,681,225 B2 | 3/2014 | Levien et al. |
| 8,682,005 B2 | 3/2014 | Watson et al. |
| 8,684,839 B2 | 4/2014 | Mattice et al. |
| 8,687,820 B2 | 4/2014 | Truong et al. |
| 8,699,869 B2 | 4/2014 | Kamimura |
| 8,711,188 B2 | 4/2014 | Albrecht et al. |
| 8,745,541 B2 | 6/2014 | Wilson et al. |
| 8,750,513 B2 | 6/2014 | Renkis |
| 8,761,840 B2 | 6/2014 | Dunko |
| 8,768,099 B2 | 7/2014 | Derrenberger et al. |
| 8,781,191 B2 | 7/2014 | Lang et al. |
| 8,819,596 B2 | 8/2014 | Holopainen et al. |
| 8,831,951 B2 | 9/2014 | Cohen |
| 8,843,950 B2 | 9/2014 | Zhang |
| 8,848,987 B2 | 9/2014 | Nölle et al. |
| 8,886,517 B2 | 11/2014 | Soricut et al. |
| 8,902,320 B2 | 12/2014 | Jung et al. |
| 8,921,473 B1 | 12/2014 | Hyman |
| 8,970,725 B2 | 3/2015 | Dekker et al. |
| 8,988,537 B2 | 3/2015 | Jung et al. |
| 9,001,215 B2 | 4/2015 | Jung et al. |
| 9,041,826 B2 | 5/2015 | Jung et al. |
| 9,082,456 B2 | 7/2015 | Jung et al. |
| 9,098,826 B2 | 8/2015 | Jung et al. |
| 9,098,958 B2 | 8/2015 | Joyce et al. |
| 9,100,742 B2 | 8/2015 | Pearah et al. |
| 9,124,729 B2 | 9/2015 | Jung et al. |
| 9,152,840 B2 | 10/2015 | Puolitaival et al. |
| 9,155,373 B2 | 10/2015 | Allen et al. |
| 9,191,611 B2 | 11/2015 | Levien et al. |
| 9,239,677 B2 | 1/2016 | Ordin |
| 9,274,598 B2 | 3/2016 | Beymer et al. |
| 9,325,781 B2 | 4/2016 | Jung et al. |
| 9,342,829 B2 | 5/2016 | Zhou et al. |
| 9,451,200 B2 | 9/2016 | Levien et al. |
| 9,467,642 B2 | 10/2016 | Hiraide et al. |
| 9,489,671 B2 | 11/2016 | Zhou et al. |
| 9,489,717 B2 | 11/2016 | Jung et al. |
| 9,600,832 B2 | 3/2017 | Zhou |
| 9,621,749 B2 | 4/2017 | Jung et al. |
| 9,646,614 B2 | 5/2017 | Bellegarda et al. |
| 9,652,032 B2 | 5/2017 | Mitchell |
| 9,652,042 B2 | 5/2017 | Oliver et al. |
| 9,659,212 B2 | 5/2017 | Nguyen et al. |
| 9,691,388 B2 | 6/2017 | Bodin et al. |
| 9,704,502 B2 | 7/2017 | Malamud et al. |
| 9,779,750 B2 | 10/2017 | Allen et al. |
| 9,819,490 B2 | 11/2017 | Jung et al. |
| 9,910,341 B2 | 3/2018 | Jung et al. |
| 9,942,420 B2 | 4/2018 | Rao et al. |
| 9,943,372 B2 | 4/2018 | Sholev et al. |
| 10,003,762 B2 | 6/2018 | Jung et al. |
| 10,039,445 B1 | 8/2018 | Torch |
| 10,055,046 B2 | 8/2018 | Lengeling et al. |
| 10,076,705 B2 | 9/2018 | Deshpande et al. |
| 10,097,756 B2 | 10/2018 | Levien et al. |
| 10,126,828 B2 | 11/2018 | Amento et al. |
| 10,318,871 B2 | 6/2019 | Cheyer et al. |
| 10,460,346 B2 | 10/2019 | Decre et al. |
| 10,488,950 B2 | 11/2019 | Wilson |
| 10,514,816 B2 | 12/2019 | Jung et al. |
| 10,545,645 B2 | 1/2020 | Kim et al. |
| 10,551,930 B2 | 2/2020 | Oliver |
| 10,721,066 B2 | 7/2020 | Malone |
| 10,915,171 B2 | 2/2021 | Shell et al. |
| 10,966,239 B1 | 3/2021 | Lewis |
| 2001/0010543 A1 | 8/2001 | Ward et al. |
| 2001/0012065 A1 | 8/2001 | Ejima et al. |
| 2001/0012066 A1 | 8/2001 | Parulski et al. |
| 2001/0014835 A1 | 8/2001 | Gauthier et al. |
| 2001/0015751 A1 | 8/2001 | Geng |
| 2001/0019359 A1 | 9/2001 | Parulski et al. |
| 2001/0020777 A1 | 9/2001 | Johnson et al. |
| 2001/0022618 A1 | 9/2001 | Ward et al. |
| 2001/0028474 A1 | 10/2001 | Parulski et al. |
| 2001/0030773 A1 | 10/2001 | Matsuura et al. |
| 2001/0034783 A1 | 10/2001 | Kitamura |
| 2001/0048774 A1 | 12/2001 | Seki et al. |
| 2001/0051874 A1 | 12/2001 | Tsuji |
| 2001/0054183 A1 | 12/2001 | Curreri |
| 2001/0056342 A1 | 12/2001 | Piehn et al. |
| 2002/0005907 A1 | 1/2002 | Alten |
| 2002/0007510 A1 | 1/2002 | Mann |
| 2002/0008765 A1 | 1/2002 | Ejima et al. |
| 2002/0013701 A1 | 1/2002 | Oliver et al. |
| 2002/0015037 A1 | 2/2002 | Moore et al. |
| 2002/0019584 A1 | 2/2002 | Schulze et al. |
| 2002/0030831 A1 | 3/2002 | Kinjo |
| 2002/0047905 A1 | 4/2002 | Kinjo |
| 2002/0049589 A1 | 4/2002 | Poirier |
| 2002/0051074 A1 | 5/2002 | Kawaoka |
| 2002/0051638 A1 | 5/2002 | Arakawa |
| 2002/0054030 A1 | 5/2002 | Murphy |
| 2002/0054175 A1 | 5/2002 | Miettinen et al. |
| 2002/0059215 A1 | 5/2002 | Kotani et al. |
| 2002/0068600 A1 | 6/2002 | Chihara et al. |
| 2002/0071277 A1 | 6/2002 | Ashbrook et al. |
| 2002/0072918 A1 | 6/2002 | White et al. |
| 2002/0076100 A1 | 6/2002 | Luo |
| 2002/0080239 A1 | 6/2002 | Fujii et al. |
| 2002/0080251 A1 | 6/2002 | Moriwaki |
| 2002/0080257 A1 | 6/2002 | Blank |
| 2002/0082844 A1 | 6/2002 | Van Gestel |
| 2002/0087546 A1 | 7/2002 | Slater et al. |
| 2002/0089543 A1 | 7/2002 | Ostergaard et al. |
| 2002/0091511 A1 | 7/2002 | Hellwig et al. |
| 2002/0097218 A1 | 7/2002 | Gutta et al. |
| 2002/0101539 A1 | 8/2002 | Yokota |
| 2002/0101568 A1 | 8/2002 | Eberl et al. |
| 2002/0101619 A1 | 8/2002 | Tsubaki et al. |
| 2002/0103651 A1 | 8/2002 | Alexander et al. |
| 2002/0103813 A1 | 8/2002 | Frigon |
| 2002/0105482 A1 | 8/2002 | Lemelson et al. |
| 2002/0105575 A1 | 8/2002 | Hinde |
| 2002/0106041 A1 | 8/2002 | Chang et al. |
| 2002/0107694 A1 | 8/2002 | Lerg |
| 2002/0116197 A1 | 8/2002 | Erten |
| 2002/0120643 A1 | 8/2002 | Iyengar et al. |
| 2002/0140803 A1 | 10/2002 | Gutta et al. |
| 2002/0150869 A1 | 10/2002 | Shpiro |
| 2002/0166557 A1 | 11/2002 | Cooper |
| 2002/0178010 A1 | 11/2002 | Weaver et al. |
| 2002/0188571 A1 | 12/2002 | Pilgrim |
| 2002/0188693 A1 | 12/2002 | Simpson et al. |
| 2002/0191076 A1 | 12/2002 | Wada et al. |
| 2002/0194414 A1 | 12/2002 | Bateman et al. |
| 2002/0196358 A1 | 12/2002 | Kim |
| 2002/0196360 A1 | 12/2002 | Miyadera |
| 2003/0001908 A1 | 1/2003 | Cohen |
| 2003/0001949 A1 | 1/2003 | Obata et al. |
| 2003/0004727 A1 | 1/2003 | Keiller |
| 2003/0004728 A1 | 1/2003 | Keiller |
| 2003/0009329 A1 | 1/2003 | Stahl et al. |
| 2003/0009335 A1 | 1/2003 | Schalkwyk et al. |
| 2003/0016856 A1 | 1/2003 | Walker et al. |
| 2003/0018472 A1 | 1/2003 | Hershkovits et al. |
| 2003/0023439 A1 | 1/2003 | Ciurpita et al. |
| 2003/0030731 A1 | 2/2003 | Colby |
| 2003/0032435 A1 | 2/2003 | Asada et al. |
| 2003/0035084 A1 | 2/2003 | Makino |
| 2003/0040910 A1 | 2/2003 | Bruwer |
| 2003/0043271 A1 | 3/2003 | Dantwala |
| 2003/0055653 A1 | 3/2003 | Ishii et al. |
| 2003/0063208 A1 | 4/2003 | Kazami |
| 2003/0075067 A1 | 4/2003 | Welch et al. |
| 2003/0076312 A1 | 4/2003 | Yokoyama |
| 2003/0076408 A1 | 4/2003 | Dutta |
| 2003/0076980 A1 | 4/2003 | Zhang et al. |
| 2003/0081738 A1 | 5/2003 | Kohnle et al. |
| 2003/0083872 A1 | 5/2003 | Kikinis |
| 2003/0090572 A1 | 5/2003 | Belz et al. |
| 2003/0095154 A1 | 5/2003 | Colmenarez |

(56) References Cited

U.S. PATENT DOCUMENTS

| | | |
|---|---|---|
| 2003/0101052 A1 | 5/2003 | Chen et al. |
| 2003/0112267 A1 | 6/2003 | Belrose |
| 2003/0114202 A1 | 6/2003 | Suh et al. |
| 2003/0115167 A1 | 6/2003 | Sharif et al. |
| 2003/0120183 A1 | 6/2003 | Simmons |
| 2003/0122507 A1 | 7/2003 | Gutta et al. |
| 2003/0122777 A1 | 7/2003 | Grover |
| 2003/0132950 A1 | 7/2003 | Surucu et al. |
| 2003/0133015 A1 | 7/2003 | Jackel et al. |
| 2003/0133577 A1 | 7/2003 | Yoshida |
| 2003/0142041 A1 | 7/2003 | Barlow et al. |
| 2003/0142215 A1 | 7/2003 | Ward et al. |
| 2003/0154078 A1 | 8/2003 | Rees |
| 2003/0163289 A1 | 8/2003 | Whelan et al. |
| 2003/0163313 A1 | 8/2003 | Rees |
| 2003/0163324 A1 | 8/2003 | Abbasi |
| 2003/0163325 A1 | 8/2003 | Maase |
| 2003/0175010 A1 | 9/2003 | Nomura et al. |
| 2003/0177012 A1 | 9/2003 | Drennan |
| 2003/0179888 A1 | 9/2003 | Burnett et al. |
| 2003/0182130 A1 | 9/2003 | Sun et al. |
| 2003/0184651 A1 | 10/2003 | Ohsawa et al. |
| 2003/0189642 A1 | 10/2003 | Bean et al. |
| 2003/0200089 A1 | 10/2003 | Nakagawa et al. |
| 2003/0202243 A1 | 10/2003 | Boys et al. |
| 2003/0204403 A1 | 10/2003 | Browning |
| 2003/0206491 A1 | 11/2003 | Pacheco et al. |
| 2003/0210255 A1 | 11/2003 | Hiraki |
| 2003/0214524 A1 | 11/2003 | Oka |
| 2003/0215128 A1 | 11/2003 | Thompson |
| 2003/0222892 A1 | 12/2003 | Diamond et al. |
| 2003/0234878 A1 | 12/2003 | Yang |
| 2004/0001588 A1 | 1/2004 | Hairston |
| 2004/0003151 A1 | 1/2004 | Bateman et al. |
| 2004/0003341 A1 | 1/2004 | alSafadi et al. |
| 2004/0004737 A1 | 1/2004 | Kahn et al. |
| 2004/0005915 A1 | 1/2004 | Hunter |
| 2004/0008263 A1 | 1/2004 | Sayers et al. |
| 2004/0015364 A1 | 1/2004 | Sulc |
| 2004/0037450 A1 | 2/2004 | Bradski |
| 2004/0040086 A1 | 3/2004 | Eisenberg et al. |
| 2004/0041904 A1 | 3/2004 | Lapalme et al. |
| 2004/0041921 A1 | 3/2004 | Coates |
| 2004/0051804 A1 | 3/2004 | Veturino et al. |
| 2004/0054358 A1 | 3/2004 | Cox et al. |
| 2004/0054539 A1 | 3/2004 | Simpson |
| 2004/0056870 A1 | 3/2004 | Shimoyama et al. |
| 2004/0059573 A1 | 3/2004 | Cheong |
| 2004/0061783 A1 | 4/2004 | Choi et al. |
| 2004/0064834 A1 | 4/2004 | Kuwata |
| 2004/0070670 A1 | 4/2004 | Foster |
| 2004/0080624 A1 | 4/2004 | Yuen |
| 2004/0082341 A1 | 4/2004 | Stanforth |
| 2004/0085454 A1 | 5/2004 | Liao |
| 2004/0087838 A1 | 5/2004 | Galloway et al. |
| 2004/0095395 A1 | 5/2004 | Kurtenbach |
| 2004/0100505 A1 | 5/2004 | Cazier |
| 2004/0103111 A1 | 5/2004 | Miller et al. |
| 2004/0109096 A1 | 6/2004 | Anderson et al. |
| 2004/0109150 A1 | 6/2004 | Igarashi |
| 2004/0119754 A1 | 6/2004 | Bangalore et al. |
| 2004/0125220 A1 | 7/2004 | Fukuda et al. |
| 2004/0139929 A1 | 7/2004 | Nightlinger et al. |
| 2004/0140971 A1 | 7/2004 | Yamazaki et al. |
| 2004/0143440 A1 | 7/2004 | Prasad et al. |
| 2004/0145660 A1 | 7/2004 | Kusaka |
| 2004/0160463 A1 | 8/2004 | Battles et al. |
| 2004/0172419 A1 | 9/2004 | Morris et al. |
| 2004/0189856 A1 | 9/2004 | Tanaka |
| 2004/0190874 A1 | 9/2004 | Lei et al. |
| 2004/0192421 A1 | 9/2004 | Kawahara |
| 2004/0193326 A1 | 9/2004 | Phillips et al. |
| 2004/0196399 A1 | 10/2004 | Stavely |
| 2004/0196400 A1 | 10/2004 | Battles et al. |
| 2004/0201681 A1 | 10/2004 | Chen et al. |
| 2004/0201709 A1 | 10/2004 | Mcintyre et al. |
| 2004/0201738 A1 | 10/2004 | Moores et al. |
| 2004/0205655 A1 | 10/2004 | Wu |
| 2004/0212713 A1 | 10/2004 | Takemoto et al. |
| 2004/0215464 A1 | 10/2004 | Nelson |
| 2004/0218045 A1 | 11/2004 | Bodnar et al. |
| 2004/0233173 A1 | 11/2004 | Bryant |
| 2004/0246272 A1 | 12/2004 | Ramian |
| 2004/0246386 A1 | 12/2004 | Thomas et al. |
| 2004/0256009 A1 | 12/2004 | Valenzuela |
| 2004/0260554 A1 | 12/2004 | Connell et al. |
| 2004/0264726 A1 | 12/2004 | Gauger, Jr. et al. |
| 2004/0267521 A1 | 12/2004 | Cutler et al. |
| 2005/0001024 A1 | 1/2005 | Kusaka et al. |
| 2005/0001902 A1 | 1/2005 | Brogan et al. |
| 2005/0007468 A1 | 1/2005 | Stavely et al. |
| 2005/0007552 A1 | 1/2005 | Fergason et al. |
| 2005/0014998 A1 | 1/2005 | Korotkov |
| 2005/0015710 A1 | 1/2005 | Williams |
| 2005/0030296 A1 | 2/2005 | Stohrer et al. |
| 2005/0036034 A1 | 2/2005 | Rea et al. |
| 2005/0047629 A1 | 3/2005 | Farrell et al. |
| 2005/0048918 A1 | 3/2005 | Frost et al. |
| 2005/0052548 A1 | 3/2005 | Delaney |
| 2005/0052558 A1 | 3/2005 | Hikeki et al. |
| 2005/0055479 A1 | 3/2005 | Zer et al. |
| 2005/0055636 A1 | 3/2005 | Graves |
| 2005/0060142 A1 | 3/2005 | Visser et al. |
| 2005/0068171 A1 | 3/2005 | Kelliher et al. |
| 2005/0086056 A1 | 4/2005 | Yoda et al. |
| 2005/0090201 A1 | 4/2005 | Lengies et al. |
| 2005/0093976 A1 | 5/2005 | Valleriano et al. |
| 2005/0094019 A1 | 5/2005 | Grosvenor et al. |
| 2005/0096034 A1 | 5/2005 | Petermann |
| 2005/0096084 A1 | 5/2005 | Pohja et al. |
| 2005/0097173 A1 | 5/2005 | Johns et al. |
| 2005/0100224 A1 | 5/2005 | Henry et al. |
| 2005/0102133 A1 | 5/2005 | Rees |
| 2005/0102141 A1 | 5/2005 | Chikuri |
| 2005/0102148 A1 | 5/2005 | Rogitz |
| 2005/0102167 A1 | 5/2005 | Kapoor |
| 2005/0104958 A1 | 5/2005 | Egnal et al. |
| 2005/0110878 A1 | 5/2005 | Dalton |
| 2005/0114131 A1 | 5/2005 | Stoimenov et al. |
| 2005/0114357 A1 | 5/2005 | Chengalvarayan et al. |
| 2005/0118990 A1 | 6/2005 | Stephens |
| 2005/0119894 A1 | 6/2005 | Cutler et al. |
| 2005/0122404 A1 | 6/2005 | Liu |
| 2005/0128192 A1 | 6/2005 | Heintzman et al. |
| 2005/0128311 A1 | 6/2005 | Rees et al. |
| 2005/0130611 A1 | 6/2005 | Lu et al. |
| 2005/0131685 A1 | 6/2005 | Roth et al. |
| 2005/0134685 A1 | 6/2005 | Egnal et al. |
| 2005/0134939 A1 | 6/2005 | Ikeda et al. |
| 2005/0137786 A1 | 6/2005 | Breed et al. |
| 2005/0146609 A1 | 7/2005 | Creamer et al. |
| 2005/0146612 A1 | 7/2005 | Ward et al. |
| 2005/0146620 A1 | 7/2005 | Jour et al. |
| 2005/0146621 A1 | 7/2005 | Tanaka et al. |
| 2005/0146746 A1 | 7/2005 | Parulski et al. |
| 2005/0149334 A1 | 7/2005 | Chen |
| 2005/0149336 A1 | 7/2005 | Cooley |
| 2005/0149979 A1 | 7/2005 | Creamer et al. |
| 2005/0159955 A1 | 7/2005 | Oerder |
| 2005/0161510 A1 | 7/2005 | Kiiskinen |
| 2005/0164148 A1 | 7/2005 | Sinclair |
| 2005/0168579 A1 | 8/2005 | Imamura |
| 2005/0171955 A1 | 8/2005 | Hull et al. |
| 2005/0179811 A1 | 8/2005 | Palatov |
| 2005/0181774 A1 | 8/2005 | Miyata |
| 2005/0181806 A1 | 8/2005 | Dowling et al. |
| 2005/0192808 A1 | 9/2005 | Sugiyama |
| 2005/0195309 A1 | 9/2005 | Kim et al. |
| 2005/0200478 A1 | 9/2005 | Koch et al. |
| 2005/0200718 A1 | 9/2005 | Lee |
| 2005/0202844 A1 | 9/2005 | Jabri et al. |
| 2005/0203740 A1 | 9/2005 | Chambers et al. |
| 2005/0212765 A1 | 9/2005 | Ogino |
| 2005/0212817 A1 | 9/2005 | Cannon et al. |

(56) References Cited

U.S. PATENT DOCUMENTS

| | | |
|---|---|---|
| 2005/0213147 A1 | 9/2005 | Minatogawa |
| 2005/0216862 A1 | 9/2005 | Shinohara et al. |
| 2005/0219396 A1 | 10/2005 | Tella |
| 2005/0249023 A1 | 11/2005 | Bodlaender |
| 2005/0254813 A1 | 11/2005 | Brendzel |
| 2005/0259173 A1 | 11/2005 | Nakajima et al. |
| 2005/0266839 A1 | 12/2005 | Paul et al. |
| 2005/0267676 A1 | 12/2005 | Nezu et al. |
| 2005/0271117 A1 | 12/2005 | Grassl et al. |
| 2005/0273489 A1 | 12/2005 | Pecht et al. |
| 2005/0275632 A1 | 12/2005 | Pu et al. |
| 2006/0005629 A1 | 1/2006 | Tokunaga et al. |
| 2006/0008256 A1 | 1/2006 | Khedouri et al. |
| 2006/0013197 A1 | 1/2006 | Anderson |
| 2006/0013446 A1 | 1/2006 | Stephens |
| 2006/0017832 A1 | 1/2006 | Kemppinen |
| 2006/0017833 A1 | 1/2006 | Gong et al. |
| 2006/0030956 A1 | 2/2006 | Kumar |
| 2006/0031126 A1 | 2/2006 | Ma et al. |
| 2006/0035651 A1 | 2/2006 | Arponen et al. |
| 2006/0036441 A1 | 2/2006 | Hirota |
| 2006/0036947 A1 | 2/2006 | Crenshaw et al. |
| 2006/0041632 A1 | 2/2006 | Shah et al. |
| 2006/0044285 A1 | 3/2006 | Ito et al. |
| 2006/0061544 A1 | 3/2006 | Ho et al. |
| 2006/0061663 A1 | 3/2006 | Park |
| 2006/0066744 A1 | 3/2006 | Stavely et al. |
| 2006/0075344 A1 | 4/2006 | Jung et al. |
| 2006/0078275 A1 | 4/2006 | Oowa |
| 2006/0085187 A1 | 4/2006 | Barquilla |
| 2006/0090132 A1 | 4/2006 | Jung et al. |
| 2006/0092291 A1 | 5/2006 | Bodie |
| 2006/0097993 A1 | 5/2006 | Hietala et al. |
| 2006/0099995 A1 | 5/2006 | Kim et al. |
| 2006/0101116 A1 | 5/2006 | Rittman et al. |
| 2006/0101464 A1 | 5/2006 | Dohrmann |
| 2006/0103627 A1 | 5/2006 | Watanabe et al. |
| 2006/0103762 A1 | 5/2006 | Ly et al. |
| 2006/0104454 A1 | 5/2006 | Guitarte et al. |
| 2006/0109201 A1 | 5/2006 | Lee et al. |
| 2006/0109242 A1 | 5/2006 | Simpkins |
| 2006/0114337 A1 | 6/2006 | Rothschild |
| 2006/0114338 A1 | 6/2006 | Rothschild |
| 2006/0114514 A1 | 6/2006 | Rothschild |
| 2006/0114516 A1 | 6/2006 | Rothschild |
| 2006/0120712 A1 | 6/2006 | Kim |
| 2006/0129908 A1 | 6/2006 | Markel |
| 2006/0132431 A1 | 6/2006 | Eliezer et al. |
| 2006/0132624 A1 | 6/2006 | Yuyama |
| 2006/0136221 A1 | 6/2006 | James et al. |
| 2006/0139459 A1 | 6/2006 | Zhong |
| 2006/0140420 A1 | 6/2006 | Machida |
| 2006/0142740 A1 | 6/2006 | Sherman et al. |
| 2006/0143017 A1 | 6/2006 | Sonoura et al. |
| 2006/0143607 A1 | 6/2006 | Morris |
| 2006/0143684 A1 | 6/2006 | Morris |
| 2006/0146009 A1 | 7/2006 | Koivunen et al. |
| 2006/0155549 A1 | 7/2006 | Miyazaki |
| 2006/0158426 A1 | 7/2006 | Hagiwara |
| 2006/0166620 A1 | 7/2006 | Sorensen |
| 2006/0170669 A1 | 8/2006 | Garcia et al. |
| 2006/0176305 A1 | 8/2006 | Arcas et al. |
| 2006/0182045 A1 | 8/2006 | Anderson |
| 2006/0187212 A1 | 8/2006 | Park et al. |
| 2006/0189349 A1 | 8/2006 | Montulli et al. |
| 2006/0192775 A1 | 8/2006 | Demaio et al. |
| 2006/0289348 A1 | 8/2006 | Montulli et al. |
| 2006/0206331 A1 | 9/2006 | Hennecke et al. |
| 2006/0208169 A1 | 9/2006 | Breed |
| 2006/0209013 A1 | 9/2006 | Fengels |
| 2006/0215035 A1 | 9/2006 | Kulas |
| 2006/0215041 A1 | 9/2006 | Kobayashi |
| 2006/0221197 A1 | 10/2006 | Jung et al. |
| 2006/0222216 A1 | 10/2006 | Harris et al. |
| 2006/0223503 A1 | 10/2006 | Muhonen et al. |
| 2006/0232551 A1 | 10/2006 | Matta |
| 2006/0238550 A1 | 10/2006 | Page |
| 2006/0239672 A1 | 10/2006 | Yost et al. |
| 2006/0250505 A1 | 11/2006 | Gennetten et al. |
| 2006/0251338 A1 | 11/2006 | Gokturk et al. |
| 2006/0251339 A1 | 11/2006 | Gokturk et al. |
| 2006/0256082 A1 | 11/2006 | Cho et al. |
| 2006/0256090 A1* | 11/2006 | Huppi .......... G06F 1/1616 345/173 |
| 2006/0257827 A1 | 11/2006 | Ellenson |
| 2006/0262192 A1 | 11/2006 | Ejima |
| 2006/0266371 A1 | 11/2006 | Vainshelboim et al. |
| 2006/0267927 A1 | 11/2006 | Augustine et al. |
| 2006/0271612 A1 | 11/2006 | Ritter et al. |
| 2006/0282472 A1 | 12/2006 | Ng et al. |
| 2006/0282572 A1 | 12/2006 | Steinberg et al. |
| 2006/0284969 A1 | 12/2006 | Kim et al. |
| 2007/0003140 A1 | 1/2007 | Morita et al. |
| 2007/0003168 A1 | 1/2007 | Oliver |
| 2007/0013662 A1 | 1/2007 | Fauth |
| 2007/0021068 A1 | 1/2007 | Dewhurst |
| 2007/0030351 A1 | 2/2007 | Blancoj et al. |
| 2007/0046641 A1 | 3/2007 | Lim |
| 2007/0046694 A1 | 3/2007 | Aizikowitz et al. |
| 2007/0050433 A1 | 3/2007 | Kim |
| 2007/0057912 A1 | 3/2007 | Cupal et al. |
| 2007/0058990 A1 | 3/2007 | Weaver et al. |
| 2007/0063979 A1 | 3/2007 | Tran |
| 2007/0067054 A1 | 3/2007 | Danish |
| 2007/0067707 A1 | 3/2007 | Travis et al. |
| 2007/0081090 A1 | 4/2007 | Singh |
| 2007/0081744 A1 | 4/2007 | Gokturk et al. |
| 2007/0085914 A1 | 4/2007 | Lim |
| 2007/0086773 A1 | 4/2007 | Hansson et al. |
| 2007/0088556 A1 | 4/2007 | Andrew |
| 2007/0100632 A1 | 5/2007 | Aubauer |
| 2007/0123251 A1 | 5/2007 | McElvaney |
| 2007/0124694 A1 | 5/2007 | Sluis et al. |
| 2007/0127575 A1 | 6/2007 | Ho |
| 2007/0132413 A1 | 6/2007 | Mays |
| 2007/0242269 A1 | 10/2007 | Trainer |
| 2007/0262965 A1 | 11/2007 | Hirai et al. |
| 2007/0273611 A1 | 11/2007 | Torch |
| 2008/0019489 A1 | 1/2008 | Lynn |
| 2008/0024594 A1 | 1/2008 | Ritchey |
| 2008/0026838 A1 | 1/2008 | Dunstan et al. |
| 2008/0082426 A1 | 4/2008 | Gokturk et al. |
| 2008/0096587 A1 | 4/2008 | Rubinstein |
| 2008/0163416 A1 | 7/2008 | Go |
| 2008/0174547 A1 | 7/2008 | Kanevsky et al. |
| 2008/0177640 A1 | 7/2008 | Gokturk et al. |
| 2008/0215337 A1 | 9/2008 | Greene et al. |
| 2008/0225001 A1 | 9/2008 | Lefebure et al. |
| 2008/0229198 A1 | 9/2008 | Jung et al. |
| 2008/0239085 A1 | 10/2008 | Kruijtzer |
| 2008/0249777 A1 | 10/2008 | Thelen et al. |
| 2008/0273764 A1 | 11/2008 | Scholl |
| 2008/0285886 A1 | 11/2008 | Allen |
| 2008/0288895 A1 | 11/2008 | Hollemans et al. |
| 2008/0309761 A1 | 12/2008 | Kienzle et al. |
| 2009/0015509 A1 | 1/2009 | Gottwald et al. |
| 2009/0018419 A1 | 1/2009 | Torch |
| 2009/0018432 A1 | 1/2009 | He et al. |
| 2009/0018828 A1 | 1/2009 | Nakadai et al. |
| 2009/0030552 A1 | 1/2009 | Nakadai et al. |
| 2009/0043580 A1 | 2/2009 | Mozer et al. |
| 2009/0067590 A1 | 3/2009 | Bushey et al. |
| 2009/0092955 A1 | 4/2009 | Hwang |
| 2009/0215503 A1 | 8/2009 | Zhang et al. |
| 2009/0227283 A1 | 9/2009 | Pylvanainen |
| 2009/0247245 A1 | 10/2009 | Strawn et al. |
| 2009/0280873 A1 | 11/2009 | Burson |
| 2009/0316006 A1 | 12/2009 | Vau et al. |
| 2010/0063820 A1 | 3/2010 | Seshadri |
| 2010/0205667 A1 | 8/2010 | Anderson et al. |
| 2011/0043617 A1 | 2/2011 | Vertegaal et al. |
| 2012/0206050 A1 | 8/2012 | Spero |
| 2012/0308039 A1 | 12/2012 | Kobayashi et al. |
| 2013/0010208 A1 | 1/2013 | Chiang |

(56) References Cited

U.S. PATENT DOCUMENTS

| | | |
|---|---|---|
| 2013/0016120 A1 | 1/2013 | Karmanenko et al. |
| 2013/0114943 A1 | 5/2013 | Ejima et al. |
| 2013/0155309 A1 | 6/2013 | Hill et al. |
| 2013/0158367 A1 | 6/2013 | Pacione |
| 2013/0215014 A1 | 8/2013 | Pryor |
| 2013/0257709 A1 | 10/2013 | Raffle |
| 2014/0104197 A1 | 4/2014 | Khosravy et al. |
| 2014/0206479 A1 | 7/2014 | Marty et al. |
| 2014/0282196 A1 | 9/2014 | Zhao et al. |
| 2014/0347363 A1 | 11/2014 | Kaburlasos |
| 2015/0029322 A1 | 1/2015 | Ragland et al. |
| 2015/0070262 A1 | 3/2015 | Karmarkar et al. |
| 2015/0312397 A1 | 10/2015 | Chiang |
| 2016/0218884 A1 | 7/2016 | Ebrom et al. |
| 2017/0161720 A1 | 6/2017 | Xing et al. |
| 2019/0058847 A1 | 2/2019 | Mayer et al. |
| 2020/0408965 A1 | 12/2020 | Karam |

FOREIGN PATENT DOCUMENTS

| | | |
|---|---|---|
| CA | 2498505 | 8/2006 |
| CA | 2423142 | 3/2013 |
| CN | 2409562 | 12/2000 |
| CN | 1338863 | 3/2002 |
| CN | 1391690 | 1/2003 |
| CN | 1394299 | 1/2003 |
| CN | 1412687 | 4/2003 |
| CN | 2591682 | 12/2003 |
| CN | 1507268 | 6/2004 |
| CN | 2717364 | 8/2005 |
| CN | 1954292 | 4/2007 |
| CN | 100345085 | 10/2007 |
| CN | 101262813 | 9/2008 |
| CN | 100454388 | 1/2009 |
| CN | 100542848 | 9/2009 |
| DE | 3102208 | 12/1981 |
| DE | 3219242 | 1/1983 |
| DE | 3238853 | 5/1983 |
| DE | 4022511 | 1/1992 |
| DE | 29510157 U1 | 8/1995 |
| DE | 19529571 | 2/1997 |
| DE | 19856798 | 12/1999 |
| DE | 19829568 | 1/2000 |
| DE | 10022321 | 11/2001 |
| DE | 10313019 B4 | 2/2005 |
| DE | 102004038965 | 3/2005 |
| EP | 0078015 | 5/1983 |
| EP | 0078016 | 5/1983 |
| EP | 0094449 | 11/1983 |
| EP | 0300648 | 1/1989 |
| EP | 0342628 | 11/1989 |
| EP | 0350957 | 1/1990 |
| EP | 0376618 | 7/1990 |
| EP | 0407914 | 7/1990 |
| EP | 0387341 | 9/1990 |
| EP | 0317758 | 2/1993 |
| EP | 0547357 | 6/1993 |
| EP | 0583061 | 2/1994 |
| EP | 0588161 | 3/1994 |
| EP | 0589622 | 3/1994 |
| EP | 0620941 | 10/1994 |
| EP | 0699940 | 3/1996 |
| EP | 0699941 | 3/1996 |
| EP | 0714586 | 6/1996 |
| EP | 0729266 | 8/1996 |
| EP | 0739121 | 10/1996 |
| EP | 0742679 | 11/1996 |
| EP | 0765079 | 3/1997 |
| EP | 0776130 | 5/1997 |
| EP | 0841655 | 5/1998 |
| EP | 0847003 | 6/1998 |
| EP | 0876035 | 11/1998 |
| EP | 0900424 | 3/1999 |
| EP | 0839349 | 9/1999 |
| EP | 0944019 | 9/1999 |
| EP | 0948198 | 10/1999 |
| EP | 0970583 | 1/2000 |
| EP | 0977080 | 2/2000 |
| EP | 0986230 | 3/2000 |
| EP | 0991260 | 4/2000 |
| EP | 0840920 | 5/2000 |
| EP | 0999518 | 5/2000 |
| EP | 1014338 | 6/2000 |
| EP | 1020847 | 7/2000 |
| EP | 1024658 | 8/2000 |
| EP | 1054391 | 11/2000 |
| EP | 1058876 | 12/2000 |
| EP | 1064783 | 1/2001 |
| EP | 1071277 | 1/2001 |
| EP | 1113416 | 7/2001 |
| EP | 1143724 | 10/2001 |
| EP | 1148703 | 10/2001 |
| EP | 1180903 | 2/2002 |
| EP | 1159670 | 9/2002 |
| EP | 1075760 | 11/2002 |
| EP | 1271095 | 1/2003 |
| EP | 1271346 | 1/2003 |
| EP | 1293927 | 3/2003 |
| EP | 1062800 | 4/2003 |
| EP | 1066717 | 5/2003 |
| EP | 1315146 | 5/2003 |
| EP | 1186162 | 7/2003 |
| EP | 1344445 | 9/2003 |
| EP | 1351544 | 10/2003 |
| EP | 1377041 | 1/2004 |
| EP | 1391806 | 2/2004 |
| EP | 1400814 | 3/2004 |
| EP | 1404105 | 3/2004 |
| EP | 1404108 | 3/2004 |
| EP | 1406133 | 4/2004 |
| EP | 1455529 | 9/2004 |
| EP | 1465420 | 10/2004 |
| EP | 1471455 | 10/2004 |
| EP | 1472679 | 11/2004 |
| EP | 1475968 | 11/2004 |
| EP | 1491980 | 12/2004 |
| EP | 0890156 | 1/2005 |
| EP | 1503581 | 2/2005 |
| EP | 1552698 | 7/2005 |
| EP | 1558028 | 7/2005 |
| EP | 1596362 | 11/2005 |
| EP | 1604350 | 12/2005 |
| EP | 1613061 | 1/2006 |
| EP | 1621017 | 2/2006 |
| EP | 1622349 | 2/2006 |
| EP | 1626574 | 2/2006 |
| EP | 1661122 | 5/2006 |
| EP | 1662362 | 5/2006 |
| EP | 1045586 | 8/2006 |
| EP | 1690410 | 8/2006 |
| EP | 1696363 | 8/2006 |
| EP | 1704710 | 9/2006 |
| EP | 1284080 | 11/2006 |
| EP | 1721452 | 11/2006 |
| EP | 1751741 | 2/2007 |
| EP | 1755441 | 2/2007 |
| EP | 1538821 | 8/2007 |
| EP | 1082671 | 3/2008 |
| EP | 1027627 | 2/2009 |
| EP | 2096405 | 9/2009 |
| EP | 2264895 | 12/2010 |
| EP | 1693827 | 3/2011 |
| EP | 1314151 | 5/2011 |
| EP | 2325722 | 5/2011 |
| EP | 0899650 | 6/2011 |
| EP | 1938573 | 8/2011 |
| EP | 1130906 | 9/2011 |
| EP | 1569076 | 1/2012 |
| EP | 2261778 | 2/2012 |
| EP | 1371233 | 4/2012 |
| EP | 1634432 | 3/2013 |
| EP | 2650759 | 10/2013 |
| EP | 2945154 | 11/2015 |
| EP | 2770400 | 9/2016 |

(56) References Cited

FOREIGN PATENT DOCUMENTS

| | | |
|---|---|---|
| EP | 1078818 | 11/2017 |
| EP | 1671480 | 5/2019 |
| EP | 2998781 | 12/2019 |
| ES | 2368347 | 11/2011 |
| ES | 2382694 T3 | 6/2012 |
| FR | 2533513 | 3/1984 |
| FR | 2800571 | 5/2001 |
| FR | 2832016 | 5/2003 |
| GB | 2066620 | 7/1981 |
| GB | 2242989 | 10/1991 |
| GB | 2300742 | 11/1996 |
| GB | 2329800 | 3/1999 |
| GB | 2351817 | 8/1999 |
| GB | 2380556 | 4/2003 |
| GB | 2401752 | 11/2004 |
| GB | 2405948 | 3/2005 |
| GB | 2406455 | 3/2005 |
| GB | 2420251 | 5/2006 |
| GB | 2424055 | 9/2006 |
| GB | 2424730 | 10/2006 |
| GB | 2430332 | 3/2007 |
| JP | S54107343 | 8/1979 |
| JP | 56012632 | 2/1981 |
| JP | S5612632 | 2/1981 |
| JP | 58080631 | 5/1983 |
| JP | S5880631 | 5/1983 |
| JP | 58137828 | 8/1983 |
| JP | 60205433 | 10/1985 |
| JP | S60205433 | 10/1985 |
| JP | S62189898 | 8/1987 |
| JP | S6382197 | 4/1988 |
| JP | 1056428 | 3/1989 |
| JP | S6456428 | 3/1989 |
| JP | 1191838 | 8/1989 |
| JP | 1191840 | 8/1989 |
| JP | H01191838 | 8/1989 |
| JP | H01191839 | 8/1989 |
| JP | H01191840 | 8/1989 |
| JP | H01193722 | 8/1989 |
| JP | H0270195 | 3/1990 |
| JP | H02153415 | 6/1990 |
| JP | H02206975 | 8/1990 |
| JP | 64-56428 | 9/1990 |
| JP | 2230225 | 9/1990 |
| JP | H02230225 | 9/1990 |
| JP | H03180690 | 8/1991 |
| JP | H04175073 | 6/1992 |
| JP | H04-316035 | 11/1992 |
| JP | H06321011 | 11/1994 |
| JP | H07-84302 | 3/1995 |
| JP | H07-84311 | 3/1995 |
| JP | H0755755 | 3/1995 |
| JP | H0772792 | 3/1995 |
| JP | H08139980 | 5/1995 |
| JP | H07333716 | 12/1995 |
| JP | H09-186954 | 7/1997 |
| JP | H1024785 | 1/1998 |
| JP | H1031551 | 2/1998 |
| JP | H1056428 | 2/1998 |
| JP | H10117212 | 5/1998 |
| JP | H10199422 | 7/1998 |
| JP | H10269022 | 10/1998 |
| JP | H11109498 | 4/1999 |
| JP | H11143487 | 5/1999 |
| JP | H11198745 | 7/1999 |
| JP | H11- 212726 | 8/1999 |
| JP | H11511301 | 9/1999 |
| JP | H11-355617 | 12/1999 |
| JP | 2000020677 | 1/2000 |
| JP | 2000-083186 | 3/2000 |
| JP | 2000101898 | 4/2000 |
| JP | 2000-163193 | 6/2000 |
| JP | 2000-221582 | 8/2000 |
| JP | 2000-231151 | 8/2000 |
| JP | 2000214525 | 8/2000 |
| JP | 2000227633 | 8/2000 |
| JP | 2000231142 | 8/2000 |
| JP | 2000235216 | 8/2000 |
| JP | 2000-285413 | 10/2000 |
| JP | 2000284794 | 10/2000 |
| JP | 2000347277 | 12/2000 |
| JP | 3124275 | 1/2001 |
| JP | 2001005485 | 1/2001 |
| JP | 2001027897 | 1/2001 |
| JP | 2001056796 | 2/2001 |
| JP | 2001305642 | 2/2001 |
| JP | 2001109878 | 4/2001 |
| JP | 3180690 | 6/2001 |
| JP | 2001266254 | 9/2001 |
| JP | 2001518828 | 10/2001 |
| JP | 2001320610 | 11/2001 |
| JP | 2002010369 | 1/2002 |
| JP | 2002-040545 | 2/2002 |
| JP | 2002049327 | 2/2002 |
| JP | 2002057764 | 2/2002 |
| JP | 2002135376 | 5/2002 |
| JP | 2002158953 | 5/2002 |
| JP | 2002183579 | 6/2002 |
| JP | 2002189723 | 7/2002 |
| JP | 2002-218092 | 8/2002 |
| JP | 2002252806 | 9/2002 |
| JP | 2002311990 | 10/2002 |
| JP | 2002345756 | 12/2002 |
| JP | 2002358162 | 12/2002 |
| JP | 2003010521 | 1/2003 |
| JP | 2003506148 | 2/2003 |
| JP | 2003066419 | 3/2003 |
| JP | 2003069884 | 3/2003 |
| JP | 2003075905 | 3/2003 |
| JP | 2003169291 | 6/2003 |
| JP | 2003281028 | 10/2003 |
| JP | 2003284050 | 10/2003 |
| JP | 2003309748 | 10/2003 |
| JP | 2003324649 | 11/2003 |
| JP | 2004504077 | 2/2004 |
| JP | 2004120526 | 4/2004 |
| JP | 2004140641 | 5/2004 |
| JP | 2004180181 | 6/2004 |
| JP | 2004221908 | 8/2004 |
| JP | 2004303000 | 10/2004 |
| JP | 2004333738 | 11/2004 |
| JP | 2004334590 | 11/2004 |
| JP | 2005004410 | 1/2005 |
| JP | 2005024792 | 1/2005 |
| JP | 2005027002 | 1/2005 |
| JP | 2005033454 | 2/2005 |
| JP | 2005-134819 | 5/2005 |
| JP | 2005148151 | 6/2005 |
| JP | 2005-181365 | 7/2005 |
| JP | 2005527256 | 9/2005 |
| JP | 2005333582 | 12/2005 |
| JP | 2006031499 | 2/2006 |
| JP | 2006039953 | 2/2006 |
| JP | 2006121671 | 5/2006 |
| JP | 2006145918 | 6/2006 |
| JP | 2006155452 | 6/2006 |
| JP | 2006515694 | 6/2006 |
| JP | 2006184589 | 7/2006 |
| JP | 2006287749 | 10/2006 |
| JP | 3915291 | 5/2007 |
| JP | 2009504081 | 1/2009 |
| JP | 2009291657 | 12/2009 |
| JP | 2011086315 | 4/2011 |
| JP | 2012179370 | 9/2012 |
| KR | 19990036555 | 5/1999 |
| KR | 19990054524 | 7/1999 |
| KR | 20010111127 | 12/2001 |
| KR | 20040054225 | 6/2004 |
| KR | 2004/0065987 | 7/2004 |
| KR | 20040075419 | 8/2004 |
| KR | 20040075420 | 8/2004 |
| KR | 20040076916 | 9/2004 |
| KR | 20040100995 | 12/2004 |
| KR | 20050011277 | 1/2005 |

(56) References Cited

FOREIGN PATENT DOCUMENTS

| | | |
|---|---|---|
| KR | 20050083364 | 8/2005 |
| KR | 20050089371 | 9/2005 |
| KR | 20050090265 | 9/2005 |
| KR | 20060034453 | 4/2006 |
| KR | 20070000023 | 1/2007 |
| KR | 100700537 | 3/2007 |
| KR | 100795450 | 1/2008 |
| KR | 100896245 | 5/2009 |
| KR | 100978689 | 8/2010 |
| RU | 2143841 | 1/2000 |
| RU | 2220057 | 12/2003 |
| TW | 200520512 | 6/2005 |
| WO | WO1989003519 | 4/1989 |
| WO | WO1995001757 | 1/1995 |
| WO | WO1996003741 | 2/1996 |
| WO | WO1996009587 | 3/1996 |
| WO | WO1997024905 | 7/1997 |
| WO | WO1997049340 | 12/1997 |
| WO | WO1998012685 | 3/1998 |
| WO | WO1999003253 | 1/1999 |
| WO | WO1999021122 | 4/1999 |
| WO | WO1999021165 | 4/1999 |
| WO | WO9936826 | 7/1999 |
| WO | WO1999057937 | 11/1999 |
| WO | WO9965381 | 12/1999 |
| WO | WO2000003348 | 1/2000 |
| WO | WO2000065873 | 11/2000 |
| WO | WO2000075766 | 12/2000 |
| WO | WO2002008860 | 1/2001 |
| WO | WO2001011896 | 2/2001 |
| WO | WO2001026092 | 4/2001 |
| WO | WO2001060029 | 8/2001 |
| WO | WO200109012 | 11/2001 |
| WO | WO2001091107 | 11/2001 |
| WO | WO2001099096 | 12/2001 |
| WO | WO2002012966 | 2/2002 |
| WO | WO2002021274 | 3/2002 |
| WO | WO2002027535 | 4/2002 |
| WO | WO2002029640 | 4/2002 |
| WO | WO2002054309 | 7/2002 |
| WO | WO2002102072 | 12/2002 |
| WO | WO2003003185 | 1/2003 |
| WO | WO2003071391 | 8/2003 |
| WO | WO2003093879 | 11/2003 |
| WO | WO2004001576 | 12/2003 |
| WO | WO2004005141 | 1/2004 |
| WO | WO2004032014 | 4/2004 |
| WO | WO2004051392 | 6/2004 |
| WO | WO2004052035 | 6/2004 |
| WO | WO2004057451 | 7/2004 |
| WO | WO2004078536 | 9/2004 |
| WO | WO2004105523 | 12/2004 |
| WO | WO2005018219 | 2/2005 |
| WO | WO2005026940 | 3/2005 |
| WO | WO2005050308 | 6/2005 |
| WO | WO2005058705 | 6/2005 |
| WO | WO2005/062591 | 7/2005 |
| WO | WO2005061249 | 7/2005 |
| WO | WO2005107407 | 11/2005 |
| WO | WO2006003588 | 1/2006 |
| WO | WO2006003591 | 1/2006 |
| WO | WO2006006108 | 1/2006 |
| WO | WO2006036069 | 4/2006 |
| WO | WO2006062966 | 6/2006 |
| WO | WO2006068123 | 6/2006 |
| WO | WO2006086863 | 8/2006 |
| WO | WO2006093003 | 9/2006 |
| WO | WO2006103437 | 10/2006 |
| WO | WO2006110765 | 10/2006 |
| WO | WO2007034392 | 3/2007 |

OTHER PUBLICATIONS

Bernardi, Bryan D., "Speech Recognition Camer with a Pmmpting Display," The Journal of the Acoustical Seciety of America, vol. 108, Issue 4, Oct. 2000, p. 1383.

Bernardi, Bryan D., "Speech Recognition Camera with a Prompting Display," The Journal of the Acoustical Society of America, vol. 109, Issue 4, Apr. 2001, p. 1287.

Chapman, William D. "Prospectives in Voice Response from Computers," R.L.A. Trost, "Film Slave," Nov. 1976, Elektor, vol. 2, No. 11, pp. 1135-1137.

Goode, Georgianna, et al., Voice Controlled Stereographic Video Camera System, Proc. SPIE vol. 1083, p. 35, Three-Dimensional Visualization and Display Technologies; Scott S. Fisher: Woodrow E. Robbins, Eds.

Harif, Shlomi, Recognizing non-verbal sound commands in an interactive computer controlled speech word recognition display system, Acoustical Society of America Journal, vol. 118, Issue 2, pp. 599-599 (2005).

Hermes operating system now also listens to "his British master's voice" (Nov. 1999).

Morgan, Scott Anthony, Speech command input recognition system for interactive computer display with term weighting means used in interpreting potential commands from relevant speech terms, The Journal of the Acoustical Society of America, vol. 110, Issue 4, Oct. 2001, p. 1723.

Panasonic VLG201CE-S Video Intercom System with Silver door station.

Philips, M.L. Adv. Resource Dev. Corp., Columbia, MD, Voice control of remote stereoscopic systems Voice control of remote stereoscopic systems, by, Southeastcon '90. Proceedings., IEEE, Apr. 1-4, 1990, 594-598 vol. 2.

Reichenspurner, et al., Use of the voice-controlled and computer-assisted surgical system ZEUS for endoscopic coronary artery bypass grafting. The Journal of thoracic and cardiovascular surgery, Jul. 1999.

Robotics: the Future of Minimally Invasive Heart Surgery (May 2000).

ST Microelectronics TSH512 Hi-fi Stereo/mono Infrared Transmitter and Stereo Sub-carrier Generator (Oct. 2005).

Non-Final Office Action in U.S. Appl. No. 11/163,391, (dated Sep. 25, 2008).

Response to Non-Final Office Action in U.S. Appl. No. 11/163,391 (dated Jan. 9, 2009).

Non-Final Office Action in U.S. Appl. No. 11/163,391, (dated Apr. 22, 2009).

Response to Non-Final Office Action in U.S. Appl. No. 11/163,391 (Sep. 22, 2009).

Final Office Action in U.S. Appl. No. 11/163,391, (dated Dec. 18, 2009).

Response to Final Office Action in U.S. Appl. No. 11/163,391 (dated Jan. 11, 2010).

Non-Final Office Action in U.S. Appl. No. 12/710,066, (dated May 3, 2010).

Response to Non-Final Office Action in U.S. Appl. No. 12/710,066 (dated Aug. 3, 2010).

Final Office Action in U.S. Appl. No. 12/710,066, (dated Oct. 18, 2010).

Response to Final Office Action in U.S. Appl. No. 12/710,066 (dated Dec. 20, 2010).

Non-Final Office Action in U.S. Appl. No. 13/087,650, (dated Apr. 19, 2012).

Response to Non-Final Office Action in U.S. Appl. No. 13/087,650 (dated Jul. 19, 2012).

Non-Final Office Action in U.S. Appl. No. 13/717,681, (dated May 21, 2013).

Response to Non-Final Office Action in U.S. Appl. No. 13/717,681 (dated Nov. 15, 2013).

File History, U.S. Appl. No. 11/163,391 (now issued U.S. Pat. No. 7,697,827) to Konicek (filed Oct. 2005).

File History, U.S. Appl. No. 12/710,066 (now issued U.S. Pat. No. 7,933,508) to Konicek (filed Feb. 2010).

File History, U.S. Appl. No. 13/087,650 (now issued U.S Pat. No. 8,467,672) to Konicek (filed Apr. 2011).

(56) References Cited

OTHER PUBLICATIONS

File History, U.S. Appl. No. 13/717,681 to Konicek (filed Dec. 2012).
Notice of Allowance in U.S. Appl. No. 13/717,681, (dated Jan. 24, 2014).
Request for Continued Examination in U.S. Appl. No. 13/717,681 (dated Mar. 14, 2014).
Non-Final Office Action in U.S. Appl. No. 13/717,681, (dated Apr. 3, 2014).
Non-Final Office Action in U.S. Appl. No. 14/199,855, (dated Apr. 24, 2014).
Response to Non-Final Office Action in U.S. Appl. No. 14/199,855, (dated May 21, 2014).
Non-Final Office Action in U.S. Appl. No. 14/203,129, (dated Apr. 25, 2014).
Response to Non-Final Office Action in U.S. Appl. No. 14/203,129, (dated Jun. 3, 2014).
File History, U.S. Appl. No. 14/199,855 to Konicek (filed Mar. 2014).
File History, U.S. Appl. No. 14/203,129 to Konicek (filed Mar. 2014).
Response to Non-Final Office Action in U.S. Appl. No. 13/717,681 (dated Jun. 30, 2014).
File History, U.S. Appl. No. 14/315,544 to Konicek (filed Jun. 2014).
Notice of Allowance in U.S. Appl. No. 13/717,681, (dated Aug. 4, 2014).
Notice of Allowance in U.S. Appl. No. 14/199,855, (dated Jul. 14, 2014).
Notice of Allowance in U.S. Appl. No. 14/203,129, (dated Jul. 14, 2014).
Notice of Allowance in U.S. Appl. No. 14/315,544, (dated Sep. 29, 2014).
Notice of Allowance in U.S. Appl. No. 14/453,511, (dated Oct. 20, 2014).
Notice of Allowance in U.S. Appl. No. 14/495,976, (dated Oct. 22, 2014).
RSC-164i Datasheet, "General Purpose Microcontroller Featuring Speech Recognition, Speaker Verification, and Speech Synthesis," Sensory, Inc. (1996).
Non-Final Office Action in U.S. Appl. No. 14/539,687, (dated Apr. 17, 2015).
Machine Translation of JP2000214525 to Yoji (date unknown).
U.S. Appl. No. 60/718,155 to Feinberg et al. (filed Sep. 15, 2005).
Smart Commander Guide to Voice Recognition (date unknown).
Network Smart Capture Ver.1.2 (dated 1997).
Partial English Translation of Network Smart Capture Ver.1.2 (date unknown).
Smart Capture Smart Commander (date unknown).
Partial English Translation of Smart Capture Smart Commander (date unknown).
Final Office Action in U.S. Appl. No. 14/539,687, (dated Nov. 16, 2015).
Response to Final Office Action in U.S. Appl. No. 14/539,687 (dated Jan. 15, 2016).
Non-Final Office Action in U.S. Appl. No. 14/539,687, (dated Feb. 4, 2016).
Response to Non-Final Office Action in U.S. Appl. No. 14/539,687 (dated May 4, 2016).
Notice of Allowance in U.S. Appl. No. 14/539,687, (dated Jul. 15, 2016).
BMW Group—Voice Commands for BMW 5 Series & 6 Series MY2004 Equipped with CCC (date unknown).
Non-Final Office Action in U.S. Appl. No. 14/950,338 (dated Oct. 7, 2016).
Non-Final Office Action in U.S. Appl. No. 15/188,736 (dated Oct. 12, 2016).
Non-Final Office Action in U.S. Appl. No. 14/614,515 (dated Mar. 6, 2017).
Response to Non-Final Office Action in U.S. Appl. No. 14/950,338 (dated Apr. 7, 2017).
Declaration of Jeffrey C. Konicek Under Rule 1.132 in U.S. Appl. No. 14/950,338 (Apr. 7, 2017).
Response to Non-Final Office Action in U.S. Appl. No. 15/188,736 (dated Apr. 12, 2017).
Declaration of Jeffrey C. Konicek Under Rule 1.132 in U.S. Appl. No. 15/188,736 (Apr. 12, 2017).
Nokia 9500 Communicator User Guide (p. 38) (Copyright 2004-2005).
HP iPAQ rX3715 Quick Specs (Jul. 27, 2004).
HP iPAQ rX3715 Data Sheet (Copyright 2004).
Ricoh RDC-1700 Operation Manual (Copyright 2000).
Machine English Translation of JP 2005-181365 to Imamura et. al.
Machine English Translation of JP H09-186954 to Yasuyuki, et al.
Machine English Translation of JP 2000-221582 to Yoji.
Machine English Translation of JP 2000-231151 to Yoji.
Machine English Translation of JP2000-083186 to Hiroshi.
Machine English Translation of JP 2002-218092 to Nobuaki.
Machine English Translation of JP 2000-285413 to Kenji et al.
Machine English Translation of JP H11- 212726 to Hideyuki et al.
Machine English Translation of JP H11-355617 to Manbu.
Machine English Translation of JP 2005-134819 to Mineko et al.
Response to Non-Final Office Action in U.S. Appl. No. 14/614,515 (dated Sep. 6, 2017).
Final Office Action in U.S. Appl. No. 14/614,515, (dated Nov. 15, 2017).
RCE and Response to Final Office Action in U.S. Appl. No. 14/614,515 (dated Mar. 15, 2018).
Non-Final Office Action in U.S. Appl. No. 14/614,515, (dated May 10, 2018).
Response to Non-Final Office Action in U.S. Appl. No. 14/614,515 (dated Nov. 2, 2018).
Non-Final Office Action in U.S. Appl. No. 14/950,370, (dated Jun. 20, 2017).
Response to Non-Final Office Action in U.S. Appl. No. 14/950,370 (dated Dec. 20, 2017).
Supplemental Response and Amendment in U.S. Appl. No. 14/950,370 (dated Feb. 8, 2018).
Notice of Allowance in U.S. Appl. No. 14/950,370, (dated May 29, 2018).
Corrected Notice of Allowance in U.S. Appl. No. 14/950,370, (dated Jun. 12, 2018).
Interview Summary in U.S. Appl. No. 15/188,736, (dated May 9, 2017).
Interview Summary in U.S. Appl. No. 15/188,736, (dated Jun. 15, 2017).
Final Office Action in U.S. Appl. No. 15/188,736, (dated Jun. 19, 2017).
Response to Final Office Action in U.S. Appl. No. 15/188,736 (dated Dec. 11, 2017).
Interview Summary in U.S. Appl. No. 15/188,736, (dated Dec. 12, 2017).
Notice of Allowance in U.S. Appl. No. 15/188,736, (dated Jan. 19, 2018).
Final Office Action in U.S. Appl. No. 14/950,338, (dated Jun. 20, 2017).
Appeal Brief in U.S. Appl. No. 14/950,338 (filed Feb. 19, 2018).
Non-Final Office Action in U.S. Appl. No. 14/950,338, (dated May 3, 2018).
Response to Non-Final Office Action in U.S. Appl. No. 14/950,338 (dated Oct. 19, 2018).
Supplemental Amendment in U.S. Appl. No. 14/950,338 (dated Nov. 6, 2018).
Notice of Allowance in U.S. Appl. No. 14/950,338, (dated Jan. 31, 2019).
Supplemental Amendment in U.S. Appl. No. 14/950,370 (dated Feb. 8, 2018).
Final Office Action in U.S. Appl. No. 14/614,515, (dated Jan. 30, 2019).
RCE and Response to Final Office Action in U.S. Appl. No. 14/614,515 (dated Jul. 17, 2019).

(56) References Cited

OTHER PUBLICATIONS

Non-Final Office Action in U.S. Appl. No. 14/614,515, (dated Aug. 5, 2019).
Machine English Translation of JP H07-84302 to Kawamura.
Machine English Translation of JP H07-84311 to Kawamura.
Machine English Translation of JP H04-316035 to Yoshimura et al.
Machine English Translation of TW 200520512 to Liu et al.
Machine English Translation of KR2004/0065987 to Matsufune.
Apex Standards—Invalidity Analysis (date Unknown) (last accessed Aug. 18, 2021).
Techson IP—Limestone Report, Report Generated: Apr. 21, 2021 (last accessed Aug. 18, 2021).
Amplified—AI Invalidity Report (date Unknown) (last accessed Aug. 18, 2021).
Traindex—Prior Art report for U. Pat. No. 7,697,827-B2 (date Unknown) (last accessed Aug. 18, 2021).
1997 IEEE International Conference on Acotics, Speech, and Signal Processing, vols. I-V. : 371-374 1997.
2004 IEEE International Conference On Multimedia and EXP (ICME), vols. 1-3. : 1579-1582 2004.
Advanced Microsystems for Automotive Applications 2000. : 181-203 2000.
Computational Linguistics. 23 (2): 269-311 Jun. 1997.
Computer Vision and Image Understanding. 73 (3): 428-440 Mar. 1999.
ETFA 2003: IEEE Conference On Emerging Technologies and Factory Automation, vol. 2, Proceedings. : 545-551 2003.
IEEE Conference on Intelligent Transportation Systems. : 397-402 1997.
IEEE Nonrigid and Articulated Motion Workshop, Proceedings. : 90-102 1997.
IEEE Transactions on Consumer Electronics. 51 (1): 240-244 Feb. 2005.
IEEE Transactions on Electron Devices. 44 (10): 1648-1652 Oct. 1997.
IEEE Transactions on Pattern Analysis and Machine Intelligence. 19 (7): 677-695 Jul. 1997.
Image Understanding Workshop, 1996 Proceedings, vols. I and II. : 805-811 1996.
Journal of Thoracic and Cardiovascular Surgery. 118 (1): Jul. 11-16, 1999.
Laser Radar Technology and Applications III. 3380: 270-278 1998.
Proceedings of the 1998 IEEE International Conference on Acotics, Speech and Signal Processing, vols. 1-6. : 3737-3740 1998.
Proceedings of the 1998 IEEE International Conference on Acotics, Speech and Signal Processing, vols. 1-6. : 665-668 1998.
Proceedings of the IEEE Intelligent Vehicles Symposium 2000. : 314-319 2000.
Speech Communication. 30 (1): 37-53 Jan. 2000.
Speech Communication. 44 (1-4): 97-112 Oct. 2004.
Non-Final Office Action in U.S. Appl. No. 16/663,742, (dated Feb. 1, 2021).
Response to Non-Final Office Action in U.S. Appl. No. 16/663,742, (dated Jun. 11, 2021).
Interview Summary in U.S. Appl. No. 16/663,742, (dated Jun. 16, 2021).
Notice of Allowance in U.S. Appl. No. 16/663,742, (dated Jul. 20, 2021).
GSM Arena specs-HP iPAQ h6325 (date unknown).
HP User Guide—HP iPAQ Pocket PC h6300 Series (2004).
Cingular and HP Launch HP iPAQ Pocket PC (Jun. 6, 2005).
Machine English translation of KR 20050083364 to Kwon.
English translation of KR 20050011277 to So.
Palm Zire Handheld Wikipedia Article (accessed Sep. 15, 2022).
Palm Z22 Wikipedia Article (accessed Sep. 15, 2022).
Palmone, Inc. "using your Treo650 smartphone" (2004).
Palm TX Wikipedia Article (accessed Sep. 15, 2022).
Machine English translation of JP 2004140641 to Takeda et al.
Palm Treo650 Wikipedia Article (accessed Sep. 15, 2022).
Leggitt, Bob "The History of Online Photo Sharing: Part 1" (https://twirpz.files.wordpress.com/2015/09/fuji-finepix-6800-and-pixology.jpg) (Sep. 26, 2015).
Kodak Gallery Wikipedia Article (date unknown).
Machine English translation of JPH11511301 to Anderson.

\* cited by examiner

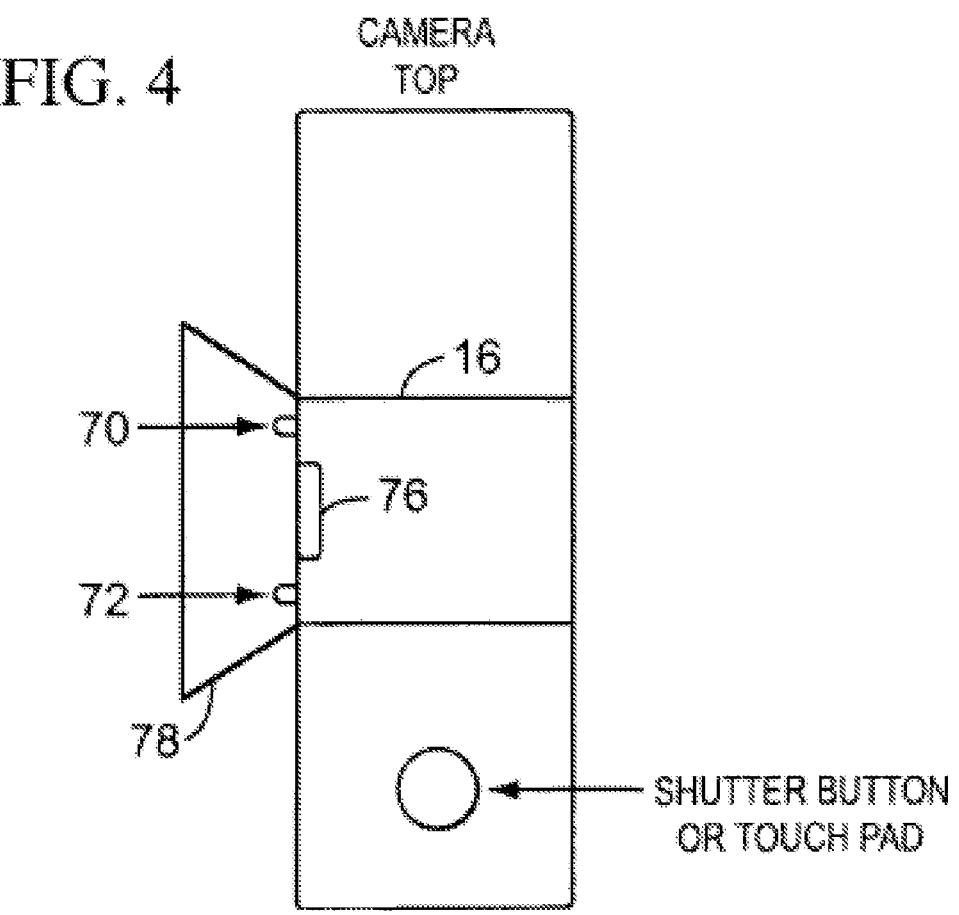

CAMERA TOUCHPAD

CROSS REFERENCE TO RELATED APPLICATIONS

This application is a continuation of pending application Ser. No. 16/663,742, filed Oct. 25, 2019, which is a continuation of application Ser. No. 14/614,515, filed Feb. 5, 2015 (abandoned), which claims the benefit of application Ser. No. 14/539,687 (now issued U.S. Pat. No. 9,485,403), filed Nov. 12, 2014, which claims the benefit of application Ser. No. 14/495,976 (now issued U.S. Pat. No. 8,917,982), filed Sep. 25, 2014, which claims the benefit of application Ser. No. 14/453,511 (now issued U.S. Pat. No. 8,923,692), filed Aug. 6, 2014, which claims the benefit of application Ser. No. 14/315,544 (now issued U.S. Pat. No. 8,897,634), filed Jun. 26, 2014, which claims the benefit of application Ser. No. 14/203,129 (now issued U.S. Pat. No. 8,818,182), filed Mar. 10, 2014, which claims the benefit of application Ser. No. 13/717,681 (now issued U.S. Pat. No. 8,831,418), filed Dec. 17, 2012, which claims the benefit of application Ser. No. 13/087,650 (now issued U.S. Pat. No. 8,467,672), filed Apr. 15, 2011, which claims the benefit of application Ser. No. 12/710,066 (now issued U.S. Pat. No. 7,933,508), filed Feb. 22, 2010, which claims the benefit of application Ser. No. 11/163,391 (now issued U.S. Pat. No. 7,697,827), filed Oct. 17, 2005, all of which are herein incorporated by reference. Reference is also made to related application Ser. No. 14/199,855 (now issued U.S. Pat. No. 8,824,879), filed Mar. 6, 2014, related application Ser. No. 14/950,338 (now issued U.S. Pat. No. 10,257,401), filed Nov. 24, 2015, related application Ser. No. 14/950,370 (now issued U.S. Pat. No. 10,063,761), filed Nov. 24, 2015, and related application Ser. No. 15/188,736 (now issued U.S. Pat. No. 9,936,116) filed Jun. 21, 2016.

BACKGROUND OF THE INVENTION

Digitally-based and film-based cameras abound and are extremely flexible and convenient. One use for a camera is in the taking of self portraits. Typically, the user frames the shot and places the camera in a mode whereby when the shutter button is depressed; the camera waits a predetermined time so that the user may incorporate himself back into the shot before the camera actually takes the picture. This is cumbersome and leads to nontrivial problems. Sometimes the predetermined delay time is not long enough. Other times, it may be too long. For participates who are in place and ready to have their picture taken, especially children, waiting with a smile on their face for the picture to be snapped by the camera can seem endless even if it is just a few seconds long. Additionally, many who might like to be included into a shot find themselves not able to be because they have to take the picture and it is simply too much trouble to set up for a shutter-delayed photograph.

Voice recognition techniques are well known in the art and have been applied to cameras, see for example, U.S. Pat. Nos. 4,951,079, 6,021,278 and 6,101,338 which are herein incorporated by reference. It is currently possible to have fairly large vocabularies of uttered words recognized by electronic device. Speech recognition devices can be of a type whereby they are trained to recognize a specific person's vocalizations, so called speaker dependent recognition, or can be of a type which recognizes spoken words without regard to who speaks them, so called speaker independent recognition. Prior art voice operated cameras have several defects remedied or improved upon by various aspects of the present invention more fully disclosed below. One such problem is that in self portrait mode, the camera may snap the picture while the user is uttering the command. Another defect is that the microphone coupled to the voice recognition unit is usually mounted on the back of the camera. This placement is non-optimal when the user is in front of the camera as when taking a self portrait. Still another problem with prior art voice activated cameras is that they associate one vocalization or utterance to one camera operation. Thus, the user must remember which command word is to be spoken for which camera operation. This is overly constraining, unnatural, and significantly reduces the utility of adding voice recognition to the camera.

One prior art implementation of voice recognition allows for menu driven prompts to help guide the user through the task of remembering which command to speak for which camera function. This method however requires that the user be looking at the camera's dedicated LCD display for the menu. One aspect of the present invention provides for the menus to be displayed in the electronic view finder of the camera and be manipulated with both voice and gaze. Another aspect of the present invention incorporates touchpad technology which is typically used in laptop computers, such technology being well know in the art, as the camera input device for at least some functions.

SUMMARY OF THE INVENTION

A self-contained camera system, according to various aspects of the present invention, includes voice recognition wherein multiple different vocalizations can be recognized and wherein some such recognized vocalizations can be associated with the same camera command. Another aspect of the invention provides for multiple microphones disposed on or in the camera system body and be operable so that the user can be anywhere around the camera system and be heard by the camera system equally well. According to other aspects of the present invention, the camera system viewfinder includes gaze tracking ability and in exemplary preferred embodiments, gaze tracking is used alone or in combination with other aspects of the invention to, for example, manipulate menus, improve picture taking speed, or improve the auto focus capability of the camera. Other aspects of the present invention, such as the addition of touchpad technology and gesture recognition provide for a improved and more natural user interface to the camera system.

Thus, it is an object of the invention to provide an improved self-portrait mode for a camera system. It is further an object of the invention to provide an improved user interface for a camera system. It is yet a further object of the invention to make a camera system more user friendly with a more natural and intuitive user interface. It is still a further object of the invention to broaden the capabilities of the camera system. It is further an object of the invention to more easily allow a user to compose a shot to be taken by the camera system. It is still further an object of the invention to improve image quality of pictures taken by the camera system. It is yet another object of the invention to improve the speed of picture taking by the camera system.

BRIEF DESCRIPTION OF THE DRAWINGS

FIG. 4 shows an exemplary embodiment of a wink detector according to various aspects of the present invention.

DESCRIPTION OF PREFERRED EXEMPLARY EMBODIMENTS

Figure 1A:
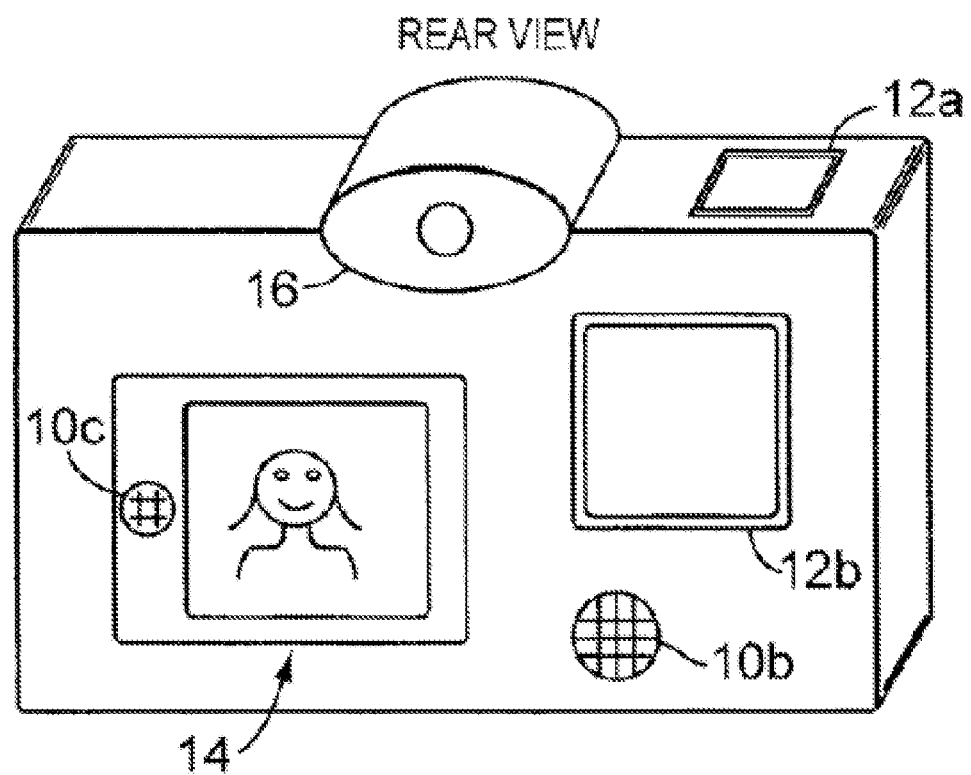
FIG. 1A is an exemplary perspective view of the rear (back) of the camera system according to various aspects of the present invention.
Figure 1B:
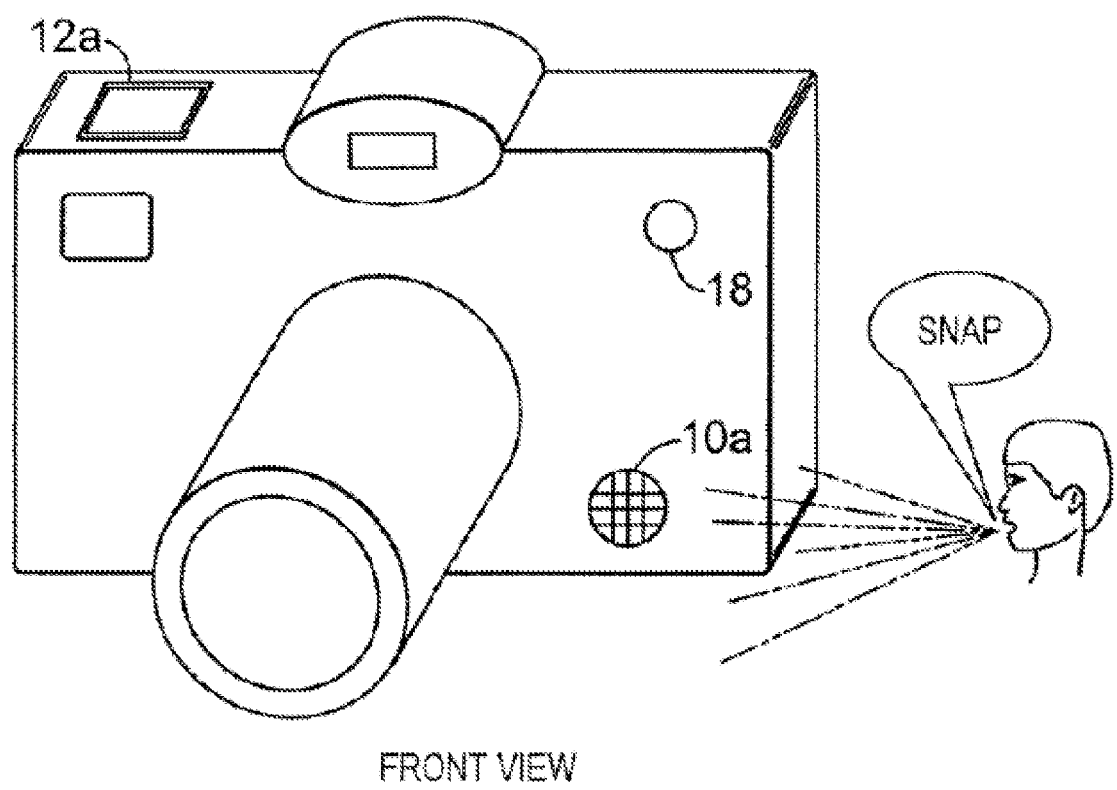
FIG. 1B is an exemplary perspective view of the front of the camera system according to various aspects of the present invention.

One aspect of the present invention solves several of the problems of the prior art voice recognition cameras in that this aspect provides for more than one microphone to be the source to the recognition unit. With reference to FIG. 1, this aspect of the present invention provides for at least two microphones to be used, one microphone, 10b, placed on the back of the camera and one microphone, 10a, placed on the front, either of which can receive voice commands. In a first preferred embodiment of this aspect of the invention, a detection device determines which microphone is to be used as the input to the recognition unit based upon the strength of the voice signal or sound level received by each of the microphones. In another preferred embodiment, the outputs of the microphones are combined as the input to the voice recognition unit. In still another embodiment, the user can select which microphone is used as the input to the voice recognition unit, for example, by a switch or by selection through a camera menu.

Figure 2:
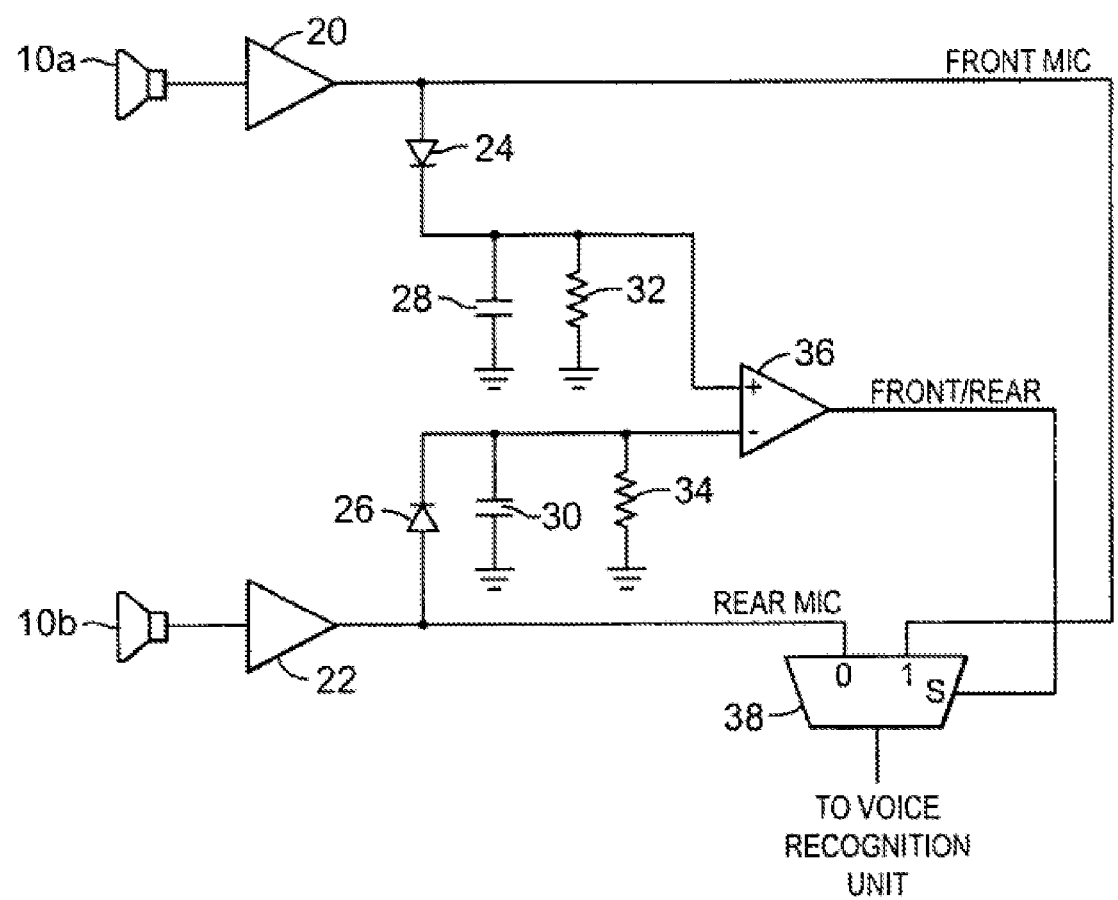
FIG. 2 is a functional representation of automatic microphone selection circuitry that may be uses in various aspects of the present invention.

Automatic microphone selection is preferred and with reference to FIG. 2, microphones 10a and 10b are each amplified by amplifiers 20 and 22 respectively. Diode 24, capacitor 28 and resister 32 form a simple energy detector and filter for microphone 10a. The output of this detector/filter is applied to one side of a comparator, 36. Similarly, diode 26, capacitor 30, and resister 34 form the other energy detector associated with microphone 10b. The output of this filter/detector combination is also applied to comparator 36. Thus, the output of this comparator selects which amplified microphone output is passed to the voice recognition unit through multiplexer 38 based on which amplified microphone output contains the greatest energy.

Figure 3:
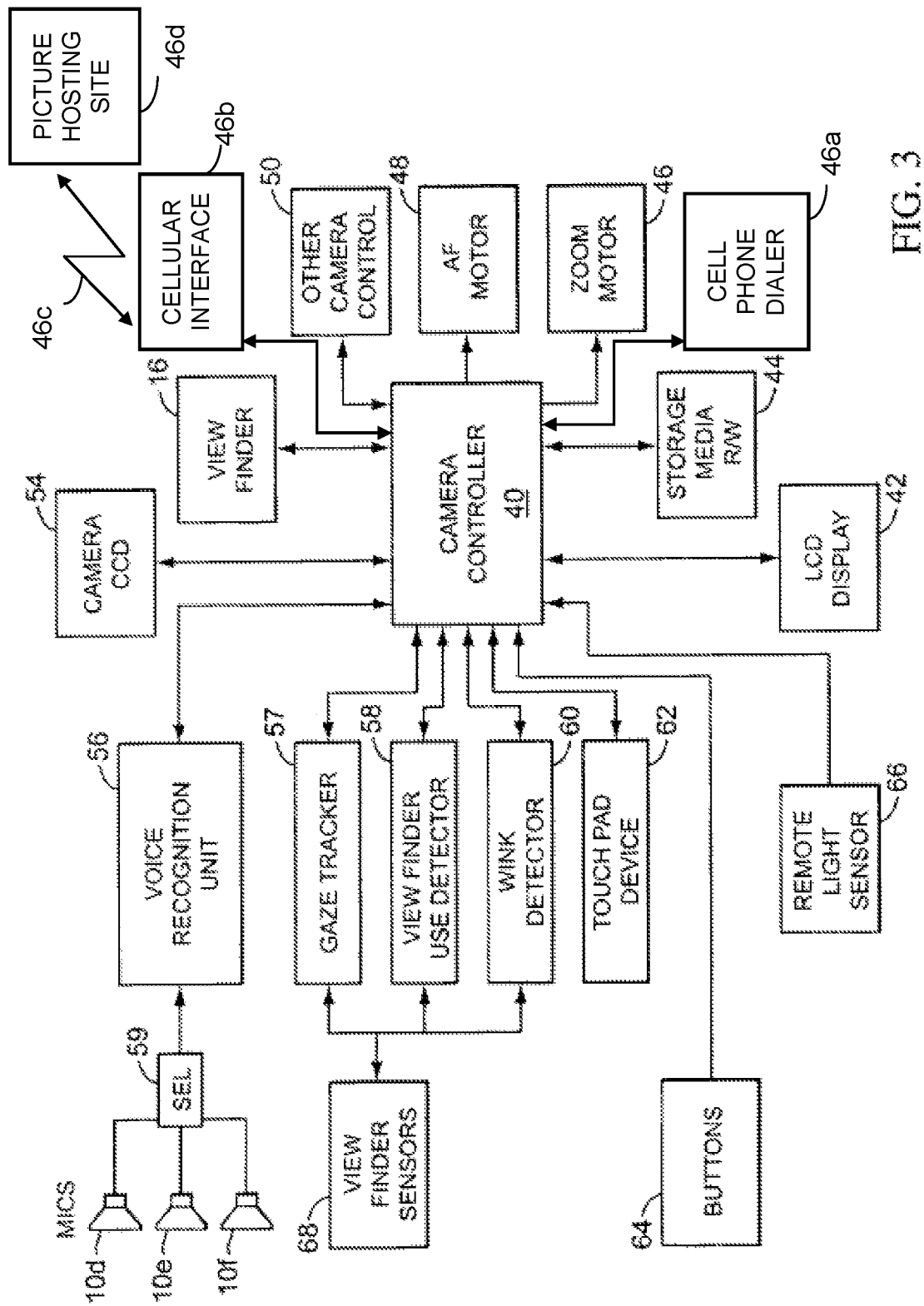
FIG. 3 shows an exemplary functional block diagram of an inventive camera system implementing various aspects of the present invention.

In yet another novel embodiment of this aspect of the invention, the multiple microphones are preferably associated with multiple voice recognition units or, alternatively, with different voice recognition algorithms well know in the art. The outputs of these multiple voice recognition units or different voice recognition algorithms are then coupled to the camera controller (FIG. 3 element 40). The camera controller preferably selects one of these outputs as being the camera controller's voice recognition input. Alternatively, the camera controller accepts the outputs of all the voice recognition units or algorithms and preferably uses a voting scheme to determine the most likely recognized command. This would obviously improve recognition rates and this aspect of the invention is contemplated to have utility beyond camera systems including, by way of example and not limitation, consumer computer devices such as PCs and laptops; portable electronic devices such as cell phones, PDAs, IPODs, etc.; entertainment devices such as TVs, video recorders, etc; and other areas.

To illustrate this embodiment using the example of the camera system having microphones on its frontside and backside given above, each of these microphones is coupled to a voice recognition unit. When an utterance is received, each voice recognition unit recognizes the utterance. The camera controller then selects which voice recognition unit's recognition to accept. This is preferably based on the energy received by each microphone using circuitry similar to FIG. 2 Alternatively, the selection of which voice recognition unit to use would be a static selection. Additionally, both recognizers' recognition would be considered by the camera controller with conflicting results resolved by voting or using ancillary information (such as microphone energy content).

An embodiment using multiple algorithms preferably has one voice recognition algorithm associated with the frontside microphone and, a different voice recognition algorithm associated with the backside microphone. Preferably, the voice recognition algorithm associated with the frontside microphone is adapted to recognize vocalizations uttered from afar (owing to this microphone probably being used in self-portraits), while the voice recognition algorithm associated with the backside microphone is optimal for closely uttered vocalizations. Selection of which algorithm is to be used as the camera controller input is preferably as above. Alternatively, as above, the selection would be by static selection or both applied to the camera controller and a voting scheme used to resolve discrepancies. While the above example contemplates using different voice recognition algorithms, there is no reason this must be so. The same algorithms could also be used in which case this example functions the same as multiple voice recognition units.

It is further contemplated in another aspect of the invention that the voice recognition subsystem be used in conjunction with the photograph storing hardware and software. In a preferred use of this aspect of the invention, the user utters names to be assigned to the photographs during storage and, later, utter then again for recall of the stored image. Thus, according to this aspect of the present invention, a stored photograph can be recalled for display simply by uttering the associated name of the photograph. The name association is preferably by direct association, that is, the name stored with the picture. In a second preferred embodiment, the photograph storage media contains a secondary file managed by the camera system and which associates the given (i.e., uttered) name with the default file name assigned by the camera system's storage hardware and/or software to the photograph when the photograph is stored on the storage media. According to the second embodiment, when a photograph is to be vocally recalled for viewing, the camera system first recognizes the utterance (in this case, the name) which will be used to identify the picture to be recalled. The camera system then scans the association file for the name which was uttered and recognized. Next, the camera system determines the default name which was given to the photograph during storage and associated with the user-given name (which was uttered and recognized) in the association file. The camera system then recalls and displays the photograph by this associated default name.

In another preferred embodiment, the voice recognition subsystem of the improved camera system recognizes at least some vocalized letters of the alphabet and/or numbers so that the user may assign names to pictures simply by spelling the name by vocalizing letters and/or numbers. Another aspect of the invention provides that stored photographs be categorized on the storage media through use of voice-recognized utterances being used to reference and/or create categories labels and that, additionally, the recognizer subsystem preferably recognize key words for manipulating the stored pictures. For instance, according to this aspect of the invention, the inventive camera system would recognize the word "move" to mean that a picture is to be moved to or from a specific category. More specifically, "move, Christmas" would indicate that the currently referenced photograph is to be moved to the Christmas folder. An alternative example is "John move new year's" indicating that the picture named john (either directly named or by association, depending on embodiment) be moved to the folder named "New Year's". It is further contemplated that the folder names may be used for picture delineation as well. For instance, the picture "John" in the Christmas folder is not the same as the picture "John" in the Birthday folder and the former may be referenced by "Christmas, John" while the latter is referenced by "Birthday, John".

Another aspect of the present invention provides that the voice recognition camera system be capable of associating more than one vocal utterance or sound with a single command. The different utterances are contemplated to be different words, sounds or the same word under demonstrably different conditions. As an example, the voice recognition camera system of this aspect of the present invention allows the inventive camera system to understand, for example, any of "shoot", "snap", "cheese", and a whistle to indicate to the camera system that a picture is to be taken. In another example, perhaps the phrase and word "watch the birdie" and "click" instruct the camera to take the picture. It is further envisioned that the user select command words from a predetermined list of the camera command words and that he then select which words correspond to which command. It is alternatively envisioned that the association of multiple recognizable words to camera commands may also be predetermined or preassigned. In another alternate embodiment, the inventive camera system allows the user to teach the camera system which words to recognize and also inform the camera system as to which recognized words to associate with which camera commands. There are obviously other embodiments for associating recognized vocalizations to camera commands and the foregoing embodiments are simply preferred examples.

In another embodiment of this aspect of the present invention, the user has his uttered commands recognized under demonstrably different conditions and recognized as being different utterances. For instance, according to this aspect of the invention, the voice operated camera system operates so that it understand commands vocalized close to the camera (as if the user is taking the picture in traditional fashion with the camera back to his face) and significantly farther away (as if the user is taking a self portrait picture and is part of the shot and thus has to vocalize loudly to the front of the camera.) For this illustration, in a preferred embodiment the user teaches the words to the camera under the different conditions anticipated. For example, the user would teach the camera system by speaking the word "snap" close to the camera and inform the camera that this is a picture taking command and would then stand far from the camera and say "snap", thus teaching another utterance, and instruct the camera that this is also a picture taking command. These two different utterances of the same word under different conditions would be stored and recognized as different utterances. This aspect of the invention contemplates that the words vocalized and/or taught need not be the same word and, as illustrated above, different words would also be considered different utterances as well.

Since voice recognition is not always 100 percent accurate, another aspect of the present invention contemplates that the camera system or a remote device, or both, preferably provide an indication that a voice command was or was not understood. Thus, using the self portrait example above, if the user vocalizes the command to take a picture but the camera system does not properly recognize the vocalization as being something it understands, the camera system would beep, or light an LED, etc. to indicate it's misrecognition. Because of the relatively small number of anticipated camera commands and allowing for multiple vocalizations to command the same action, it is expected that the recognition rates will be quite high and fairly tolerant of extraneous noise without necessarily resorting to the use of a highly directional or closely coupled (to the user's mouth) microphone though the use of such devices is within the scope of the invention.

It is anticipated that the user of the inventive camera system may be too far away from the camera system for the camera system to recognize and understand the user's vocalizations. Thus, another aspect of the invention provides that the camera is equipped with a small laser sensor (FIG. 1 element 18) or other optically sensitive device such that when a light of a given frequency or intensity or having a given pulse sequence encoded within it is sensed by the camera system equipped with the optically sensitive device, the camera system immediately, or shortly thereafter (to give the user time to put the light emitting device down or otherwise hide it, for example) takes a picture. The light emitting device is preferably a laser pointer or similar, stored within the camera housing when not needed so as to not be lost when not in use. Additionally, the light emitting device's power source would preferably be recharged by the camera system's power source when so stored. In another embodiment, it is also contemplated that the light emitting device may be housed in a remotely coupled display which is disclosed below. The light emitting device preferably includes further electronics to regulate the emitted light intensity or to encode a predetermined pulse sequence (on-off pulses for example) or otherwise onto the emitted light, all of which techniques are well known in the art, which the camera system of this aspect of the present invention would receive and recognize by methods well known in the art.

Another aspect of the present invention provides for there being a predetermined delay introduced between recognizing a voice command and the camera actually implementing the command. This aspect of the invention allows time, for example, for the user to close his mouth or for others in a self-portrait shot to settle down quickly before the picture is actually taken. In a first preferred embodiment of this aspect of the invention, the delay is implemented unconditionally for at least the picture taking command. In a second preferred embodiment of this aspect of the invention, the delay introduced is dependent upon from where the command came relative to the camera system. For instance, if the camera system recognized the command as coming from the frontside microphone, delay is used, but if the command comes from the backside microphone, then no delay is implemented. The simple energy detection circuitry of FIG.

2, described above is easily adapted for this function. In an alternative embodiment, implementation of the delay is dependent upon the location of the microphone due to the orientation of the flip-up or swivel LCD display when the microphone is attached to the LCD display (FIG. 1, element 12c). For example, if the microphone in the display subhousing is oriented forward relative to the camera body then delay is implemented, if the microphone is not oriented forward then no delay is introduced. Determining the orientation of this microphone relative to the camera body is known in the art and would typically be done with switches or other sensor devices. Another preferred embodiment of this aspect of the invention implements the delay for only certain commands, such as the command to take a picture. In yet another preferred embodiment, whether the delay is implemented at all is selectable by the user.

Another aspect of the present invention provides that the camera LCD display (FIG. 1, element 14) employs touch sensitive technology. This technology is well known in the computer art and can be any of resistive, capacitive, RF, etc touch technology. This aspect of the present invention allows the user to interact with menus, features and functions displayed on the LCD display directly rather than through ancillary buttons or cursor control. For those embodiments of touch technology requiring use of a stylus, it is further contemplated that the camera body house the stylus for easy access by the user.

According to another aspect of the present invention, it is envisioned that the current dedicated LCD display (FIG. 1, element 14) incorporated on a digital camera be made to be removable and be extendable from the camera by cable, wireless, optical, etc. interconnection with the camera. In one embodiment, this remote LCD would be wire-coupled to receive display information from the digital camera through a pluggable port. In another embodiment, the remote LCD would be wirelessly coupled to the digital camera through any of several technologies well understood in the art including, by way of example only, Bluetooth, WIFI (802.11 a/b/g/n), wireless USB, FM, optical, etc. In a another embodiment of this aspect of the invention, the remotely coupled display would serve the dual purpose of being a remote input terminal to the camera system in addition to being a dedicated display for the camera system. Preferably, as mentioned earlier, the display is touch sensitive using any of the touch sensitive technology well understood in the art such as resistive, capacitive, RF, etc., methods mentioned above. Touch commands input by the user would be coupled back to the camera system as needed. It is also contemplated that the remote display house the stylus if one is required.

In another preferred embodiment, the remotely coupled display has buttons on it to control the camera system. In another embodiment, the remotely coupled display contains the microphone for receiving the voice commands of the user, digitizing the received voice, analyzing and recognizing the vocalization locally and sending a command to the camera system. In another preferred embodiment, the remotely coupled display containing the microphone simply digitizes the vocalization received by the microphone and transmits the digitized vocalization to the camera system for recognition of the vocalization by the camera system itself. In all embodiments of the wireless remote display, it is preferred that the display contain its own power source, separate from the power source of the camera. It is also contemplated that the display's separate power source may be coupled to the camera's power source when the display is 'docked' to the camera so that both may share power sources or so that the camera's power source may recharge the display's power source.

According to another aspect of the present invention, the electronic view finder (EVF) typically used on modern digital cameras includes a gaze tracking capability which is well known in the art, see for example U.S. Pat. No. 6,758,563 to Levola which is herein incorporated by reference. In this aspect of the present invention, menus typically used for user interface to the camera are electronically superimposed in the image in the EVF. The gaze tracker subsystem is operable for determining the area or approximate location of the viewfinder image at which the user is gazing. Thus, by the user looking at different areas of the EVF image, the gaze tracker subsystem informs the camera system so that a mouse-like pointer or cursor is moved by the camera system to the area of the EVF image indicated by the gaze tracking device to be the area the user is viewing. Preferably, the user then speaks a command to indicate his selection of the item pointed to by the pointer image. Alternatively, the user may indicate through other methods that this is his selection, such as staring at a position in the image for a minimum predetermined time or pressing a button, etc. As an example, the EVF displays icons for flash, shutter speed, camera mode, etc (alone or superimposed on the normal viewfinder image.) By gazing at an icon, a small compositely rendered arrow, cursor, etc., in the EVF image is caused by the gaze tracker subsystem to move to point to the icon at which the user is determined to be gazing by the gaze tracking subsystem, for instance, the camera mode icon as an example here. Preferably, the user then utters a command which is recognized by the camera system as indicating his desire to select that icon, for example, "yes" or "open".

Alternatively, the icon is selected by the user gazing at the icon for some predetermined amount of time. When the icon is selected by whatever method, the EVF image shows a drop down menu of available camera modes, for example, portrait, landscape, fireworks, etc. The user, preferably, then utters the proper command word from the list or he may optionally gaze down the list at the mode he desires whereupon the gaze tracker subsystem directs that the pointer or cursor in the EVF image moves to the word and, preferably highlighting it, indicates that this is what the camera system thinks the user want to do. The user, preferably, then utters a command indicating his acceptance or rejection of that mode in this example, such as 'yes' or 'no'. If the command uttered indicates acceptance, the camera system implements the command, if the command indicates rejection of the selected command, the camera system preferably moves the pointer to a neighboring command. To leave a menu, the user may utter 'end' to return to the menu above or 'home' to indicate the home menu. Preferably, the user can also manipulate the pointer position by uttering commands such as "up", "down", "left" and "right" to indicate relative cursor movement. In this way, the user interacts with the camera in the most natural of ways, through sight and sound cooperatively. While the above example used the preferred combination of gaze and voice recognition, it is contemplated that gaze tracking be combined with other input methods such as pushing buttons (like a mouse click) or touch input disclosed below, or gesture recognition disclosed below, etc. as examples.

Another application of this aspect of the invention uses gaze tracking to assist the auto focus (AF) capability of the prior art camera. AF generally has too modes, one mode uses the entire image, center weighted, to determine focus, another mode allows different areas of the image to have greater weight in determining focus. In the second mode, the user typically pre-selects the area of the framed image that he wishes to be over-weighted by the AF capability. This is cumbersome in that the user must predict where he wants the weighting to be ahead of time, thus, this embodiment of this aspect of the invention provides that the gaze tracker subsystem inform the AF capability of the camera system as to the location of the image that the user is gazing and that the AF capability use this information to weight this area of the image when determining focus. It is contemplated that the AF system may only provide for discrete areas of the image to be so weighted and in this case, preferably, the AF capability selects the discrete area of the image closest to that being gazed upon.

Another embodiment of this aspect of the invention uses the gaze tracker to enable the flash of the camera system. Flash is common used to "fill" dimly lit photographic scenes but sometimes this is not warranted. Other times, it is desired to have "fill" flash because the area of the scene desired is dark but the rest of the scene is quite bright (taking a picture in shade for example) and the camera does not automatically provide "fill" flash because the overall image is bright enough. Typically, the amount of "fill" flash the camera will give is determined by the camera measuring the brightness of the scene. The inventive camera system with gaze tracking is used to enhance the prior art method of determining the desire and amount of "fill" flash in that the inventive camera system gives more weight, in determining the scene brightness, to the area of the scene indicated by the gaze tracker as being gazed upon.

Another aspect of the present invention adds touchpad technology to the prior art camera system. Use of the word 'touchpad' throughout this disclosure should be construed to mean either the touchpad itself or the touchpad with any or all of a controller, software, associated touchpad electronics, etc. This touchpad technology is similar to the touchpad mouse pad used on laptop computers which is also well understood in the computer art. In a first preferred embodiment, the EVF (or LCD display) displays the menus as above and the user moves the cursor or mouse pointer around this image by use of his finger on the touchpad. This operation is virtually identical to that of the mouse in laptop computers and is well understood in the art. Preferably, the touch pad is mounted on the top of the camera at the location typically used for the shutter button (FIG. 1 element 12a). It is also preferred that the touchpad software implement 'tapping' recognition, also well known in the art, so that the user may operate the shutter button, make a selection, etc. simply by tapping the touchpad with his index finger, much the same way modern laptop driver software recognizes tapping of the touchpad as a click of the mouse button. It is also currently preferred that tapping recognition is used to make selections on the menus shown in the EVF, LCD display, or otherwise.

Another application of this aspect of the invention uses the touchpad to inform the camera system to zoom the lens simply by the user stroking his finger from front to back (for example, to zoom) or back to front over the touchpad (for example, to wide angle). For this aspect of the present invention, a preferred embodiment has the touchpad on the barrel of the lens. This is a most natural way to control zoom since the movement of the finger is a gesture with the user 'pulling' the object to be photographed closer (front to back stroke means zooming) or 'pushing' the object to be photographed away (back to front stroke means wide angle). According to another aspect of the invention, the touchpad replaces the shutter button functionality and the preferable location for this embodiment is top mounted. Preferably, the touchpad is tapped once to focus the camera and/or lock the AF and tapped a second time to trip the shutter. Alternatively, the inventive camera system simply senses the person's touch of the touchpad, auto focuses the camera and/or locks the focus or provides continually focusing while the person's touch is sensed and wherein a tap of the touchpad then trips the shutter. Preferably, the camera system enforces a maximum amount of time that the AF may be locked so that action photographs will not be badly focused. Automatically locking the AF settings for a maximum predetermined time after AF activation or continuously focus upon AF activation is also applicable to the prior art AF button activation method described below. While a computer-like touchpad was used to illustrate the above preferred embodiments of this aspect of the invention, the touch sensitive input device could be comprised of other structure, for instance, the aforementioned touch-sensitive LCD display. Also, throughout this disclosure, the word 'continuous' (and its variants, e.g., continually, etc.) should be construed to mean discretely continuous in addition to its analogue-world definition.

In a second preferred embodiment of this aspect of the invention, the touchpad is placed on the back of the camera (FIG. 1 element 12b) and is operable for manipulated the cursor and menus shown on the LCD or EVF display. This provides a much more natural and computer-like interface to the camera system. It is also contemplated that either embodiment of this aspect of the invention may be coupled with voice recognition so that the user may interact with the camera by touchpad manipulation in combination with voice commands. Additionally, combined with gaze tracking, the user can interact with the camera through touch, voice, and gaze (i.e., sight) to manipulate menus, control the camera system, compose the shot, focus, zoom, enable/disable flash, select macro or panoramic camera modes, etc.

One of the most annoying properties of the modern digital camera is the shutter delay that occurs when a picture is taken. That is, the delay between the user depressing the shutter button and the camera actually taking the picture. This delay can be as much as one second on some modern digital cameras and is typically due to the camera focusing and then taking the picture after the shutter button is depressed. One solution to this implemented by prior art cameras is for the camera to sense when the shutter button is depressed half way, then focus and lock the AF settings of the camera while the shutter button remains half way depressed, so that when the user depresses the shutter button the rest of the way, the picture is taken almost instantaneously. This solution is more often than not misused or misunderstood by novice users or those who do not use their camera regularly and can also result in blurred action photographs. Thus, one aspect of the present invention provides that the viewfinder be coupled to a unit for detecting when the user's eye is viewing through the viewfinder. When viewfinder use is detected, the inventive camera system preferably enables the auto focus system to continually focus thus ensuring that the shot is focused when the camera system is commanded to take a picture. Preferably, the gaze tracker is used for this determination though this aspect of the invention may be implemented without gaze tracking.

In a preferred embodiment of this aspect of the invention without gaze tracking, the viewfinder is equipped with a small light emitting device and a light detection device both well known in the art. With reference to FIG. 4, the light emitting device, 70, emits a frequency or frequencies of light some of which is reflected from the eyeball when a user is viewing through the viewfinder, 74. The light detection device, 72, is operable for sensing this reflected light and an amplifier (not shown) coupled to device 72, amplifies the signal from the light detection device, 72. Obviously, if there is no one viewing through the viewfinder, then there will be no reflected light from the eyeball and the amplifier output will be near ground, however, when a person peers into the viewfinder, light will be reflected from his eyeball and the output of the amplifier will be significantly larger. Thus, this system and method provides a way for detecting the use of the viewfinder by the user without providing gaze tracking ability. It is contemplated that this system and method be used with both EVF and optical (i.e., traditional) viewfinders and that viewport, 76, may be an LCD, optical lens, etc. Shroud 78 typically included on modern viewfinders helps to improve viewfinder use detection by cutting down on extraneous light reaching device 72 when the user is viewing through the viewfinder. It should be noted that the location of elements 70 and 72 in FIG. 4 is exemplary only and other placements of these elements are within the scope of this aspect of the invention. While the above embodiment of this aspect of the invention relied on eyeball reflectivity, in an alternate embodiment it is contemplated that the viewfinder use detect can be made with a light source and light detector juxtaposed wherein the eye interrupts the light between the two thus indicating viewfinder use, or that the shroud be fitted with a touch sensor around its outer ring that would sense the person's contact with the shroud when the viewfinder is in use. Additionally, it is contemplated that embodiments of this aspect of the invention may employ filters or other structures to help minimize false viewfinder use detection due to sunlight or other light sources shining on detector 72 when a user is not viewing through the viewfinder.

Another aspect of the present invention is to employ a wink-detector as part of the viewfinder of the camera. Preferably, the gaze tracker is modified for this purpose. Alternatively, the previously disclosed viewfinder use detector may also be employed. All that is required is to additionally detect the abrupt change in reflected light from the eye that would be caused by the eyelid wink. The wink-detector is contemplated to be used for shutter trip and/or AF activation or lock among other things. It is contemplated that it be used in the aforementioned application wherein the menus of the camera are displayed on the EVF. In this case, the wink detector preferably acts as a user selection detector device in that the user may select an item pointed to by the gaze tracker pointer or that is otherwise highlighted by the gaze tracker simply by winking. It is contemplated that the detected wink would preferably function in the camera system similarly to a left mouse click on a computer system when dealing with menus and icons. In this way, the camera system with wink detector of this aspect of the present invention becomes a optical gesture-recognizing camera wherein the gesture is optically received and electronically recognized (gesture recognition is also contemplated to be used in the touchpad software as described above.)

In an enhancement of this aspect of the invention, the wink detector subsystem discriminates between a wink and a blink by preferably determining the amount of time taken by the wink or blink. If the amount of time taken for the gesture (blinking or winking) is below a certain threshold, the gesture is considered a wink and disregarded.

Once a user of a camera has taken pictures, typically he will wish to print or otherwise develop the pictures for viewing, framing, etc. Another aspect of the present invention provides for simpler photo offloading from the modern digital camera when a set of predetermined conditions, such as day, time, number of pictures to offload, etc., are met. The camera system preferably includes the ability for the user to indicate to the camera which pictures to offload so that the camera offloads only those pictures that are so indicated by the user. In a first preferred embodiment of this aspect of the invention, the camera system is internally equipped with wireless interface technology by a wireless interface to the camera controller for interfacing directly to a photo printer or other photo rendering device. Currently preferred is WIFI (i.e., IEEE 802.11 a/b/g/n) with alternatives being Bluetooth, or wireless USB all of which are known in the art. By connecting via WIFI, the inventive camera system can preferably access other devices on the LAN associated with the WIFI for the storing of pictures onto a computer, network drive, etc. In additional, preferably, devices on the network can access the camera system and the pictures within it directly and also access camera settings, upload new software or updates to the camera system, etc. Since one of the big complaints with wireless technology for small devices is the often-obtrusive antenna, it is greatly preferred for this aspect of the invention that the wireless hardware including antenna be completely contained within the body of the camera system.

In a second preferred embodiment of this aspect of the invention, the inventive camera system is equipped with software and hardware coupled to the camera controller allowing independent communication with a computer network for the primary purpose of communicating its pictures over the internet. Currently preferred is WIFI which is typically connected by LAN, routers, etc. to the internet and which usually allows WIFI-equipped devices to independently connect to the internet (FIG. 3, element 46*c*). Alternatively, the invention contemplates the use of wired LAN, cellular data networks, etc. as the interconnection technology (FIG. 3, element 46*b*) used by the inventive camera system. The inventive camera system is further preferably equipped with a microbrowser that runs on the inventive camera system's camera controller which is preferably a microprocessor. It is contemplated that some embodiments may not be required a microbrowser (see enhancement below). Design and operation of microbrowser-equipped electronic devices for use with the internet is well known in the art and need not be discussed further. The camera system LCD display serves the purpose of displaying internet webpages when the user is navigating the internet in addition to its function as the camera display. So equipped, the inventive camera system can now independently upload its pictures to any of the internet-based photo printing services, such as those provided by Walmart.com, Walgreens.com, Kodak.com, etc., without the need for first storing the photos to a computer system and then connecting the computer system to the internet to upload the pictures. Use of these internet services for printing photos is preferred by many over use of a home photo printer because of the convenience, ease, availability, quality and lower per-picture printing costs. Providing the novel combination of a high photo-quality camera system with direct access to the internet according to this aspect of the present invention will further improve the utility of the camera system and these services.

In an enhancement to the above-disclosed embodiments of this aspect of the invention, the inventive camera system is operable for being instructed to automatically initiate a connection to the internet, LAN, printer, etc. whenever the predetermined conditions are met and it is in range of the network connection, (e.g., WIFI, Bluetooth, wireless USB, wired LAN, etc). Once the transmittal of the pictures is complete, the inventive camera system preferably terminates the connection. Additionally, the inventive camera system is preferably operable so that the automatic connection is made only at certain times of the day or weekends, etc., so as to confine picture transmission to periods of low network usage or periods of cheaper network access, etc. Also, it is currently preferred that the user be queried to allow the automatic connection though this is obviously not required and the connection can be made completely autonomously. Thus, in the first embodiment above, the inventive camera system automatically sends its pictures to a printer or other device on the LAN for printing or for remotely storing the pictures in the inventive camera system, whenever the inventive camera system is in range of the LAN network connection and connection can be made. In the second embodiment above, the inventive camera system automatically connects to the internet preferably via WIFI, although cellular network, etc. connection is also contemplated, when it has a predetermined number of pictures and can so connect, and will send the pictures to virtually any internet destination without user intervention. For example, the inventive camera system can be instructed to automatically send the pictures to an email account, internet picture hosting site (FIG. 3, element 46d), web-based photo printing site, the user's internet-connected home computer (when he is on vacation, for instance), etc. In this way, valuable pictures are immediately backed-up and the need for reliance on expensive camera storage media like flash cards, SD, etc. is greatly reduced.

Many prior art digital cameras can now record images continuously at 30 frames per second (i.e., take movies) along with sound. Thus, a prior art camera having an internet connection capability as herein taught combined with well known and straightforward editing methods enables inventive on-camera movie composition. According to this aspect of the invention, the inventive camera records a series of images, (e.g., a movie) and then the user downloads an MP3 file (i.e., a sound file) from a network (e.g., internet) source to be associated with the movie taken so that when the movie is played, the MP3 file also plays. Alternatively, the MP3 content is embedded in the movie, either as is, or re-encoded. Additionally, the user may download other movie material or still images via the network connection for insertion in the camera-recorded movie or for the replacement of certain individual camera-taken "frames" in the movie.

FIG. 3 shows an exemplary functional block diagram of the improved, camera system according to various aspects of the present invention. The figure shows one possible exemplary embodiment contemplated and the figure should not be used to limit the teaching of this disclosure to a certain implementation, embodiment, combination of aspects of the present invention, or otherwise.

Another aspect of the present invention provides that prior art features of the cell phone (FIG. 3, element 46a) are combined so that voice control of the camera in the cell phone can be accomplished. Many modern cell phones incorporating cams also provide voice recognition-driven dialing. Therefore, the functionality necessary for recognizing vocalizations within a cellular communication device exists in the art but has not been applied to the cell phone camera. This aspect of the present invention couples the voice recognition unit of a cell phone to the camera control unit of the cell phone either directly or via the cell phone controller, thus enabling voice control of the cell phone camera. Preferably, when recognizing a vocalization, the cell phone controller programming would also include the step of determining if the recognized vocalization was for camera control, or for dialing. Such determination would preferably be by reserving certain recognized keywords to be associated with camera functions (e.g., snap, shoot, etc). Alternatively, the cell phone may be explicitly placed into camera mode so that it is known ahead of time that recognized utterances are for camera control.

Cell phones being so light and without much inertia are hard to steady and the fact that the user must push a button on something so light makes it even harder to keep steady particularly given the small size of the shutter button on some cell phones. This aspect of the present invention would make picture taking on cell phones simpler and more fool proof.

Another aspect of the invention provides that the prior art voice recognition unit of the cell phone be adapted to recognize at least some email addresses when spoken. Another aspect of this inventive adaptation is to adapt the cell phone voice recognizer to identify the letters of the alphabet along with certain key words, for example, "space", "underscore", "question mark", etc and numbers so that pictures may be named when stored by spelling, for example. This aspect of the invention is contemplated to serve the dual purpose of being usable for text messaging or chat text input on the cell phone in addition to picture labeling.

Additionally, other aspects of the present invention taught for the improved camera system are applicable to the improved cell phone herein disclosed particularly the aspect of the present invention associating multiple different utterances to a single command. The aspect of the invention allowing for automatic connection to a LAN or the internet is also contemplated for use with cell phone cameras. This aspect of the invention ameliorates the prior art storage space limitation which severely hampers the utility of the cell phone camera. Cellular service providers typically charge a fee for internet access or emailing and so an automatic feature to connect to the net or send email for the purposes of transmitting pictures can improve revenue generation for these companies.

The embodiments herein disclosed for the various aspects of the present invention are exemplary and are meant to illustrate the currently preferred embodiments of the various aspects of the invention. The disclosed embodiments are not meant to be exhaustive or to limit application of the various aspects of the invention to those embodiments so disclosed. There are other embodiments of the various aspects of the present invention that are within the scope of the invention. Additionally, not all aspects of the invention need to be practiced together, it is contemplated that subsets of the disclosed aspects of the present invention may be practiced in an embodiment and still be within the scope of the present invention. For instance, an embodiment combining a touch sensitive shutter button with a viewfinder use detector so that focusing is only accomplished when both the shutter button is touched and viewfinder use is detected. Another embodiment contemplated is to use the viewfinder use detector to automatically turn the EVF on and the LCD display off when viewfinder use is detected instead of the prior art method of pressing a button which typically toggles which of the two is on and which is off. Still another contemplated embodiment applies the touch gesture recognition typically used with the computer-like touchpad technology to a touch sensitive display, such as the touch sensitive LCD of the camera and other devices herein disclosed that utilize an LCD display. Combining various aspects of the invention herein disclosed, such as voice recognition, touch input, gaze tracking, etc for camera control provides much more natural and human interfacing to the camera system for the control of camera menus, camera features, camera options, camera settings, commanding picture taking, enabling flash, etc.

Figure 5A:
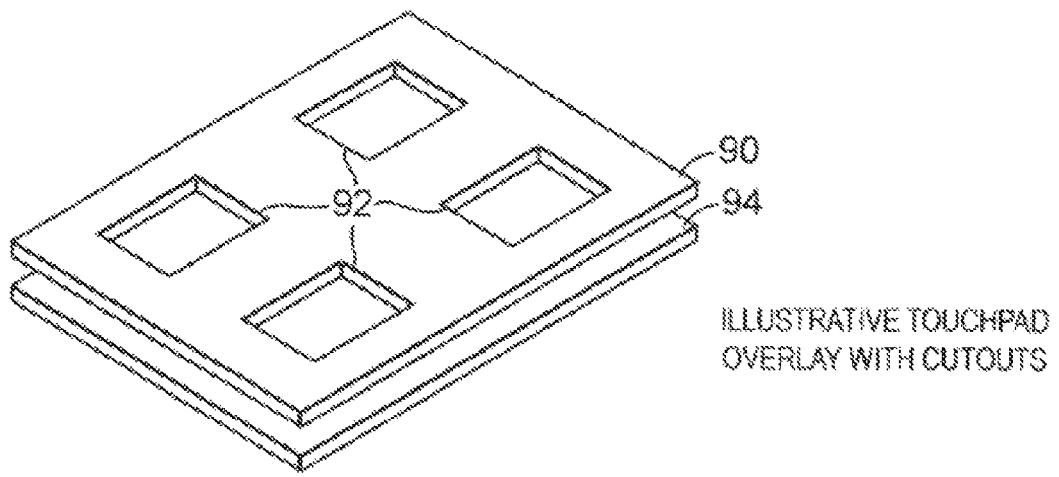
FIG. 5A shows an exemplary touchpad overlay with cutouts according to various aspects of the present invention.
Figure 5B:
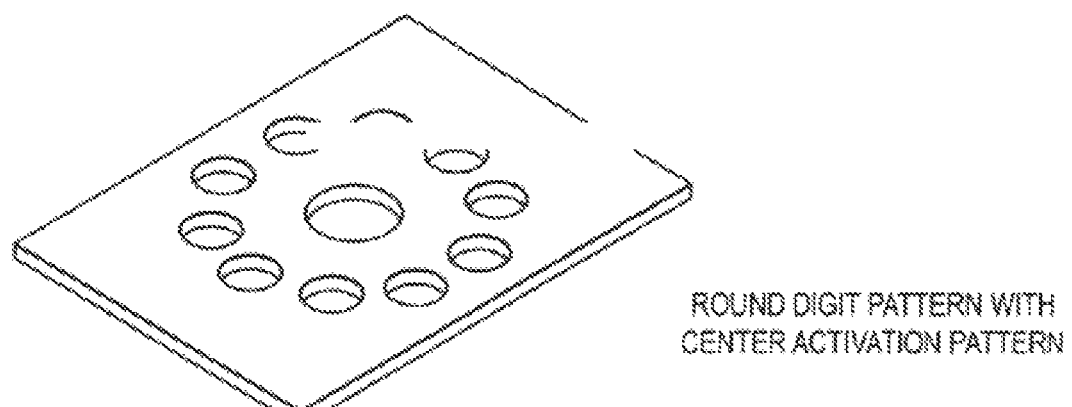
FIG. 5B shows an exemplary touchpad overlay with cutouts according to various aspects of the present invention.
Figure 5C:
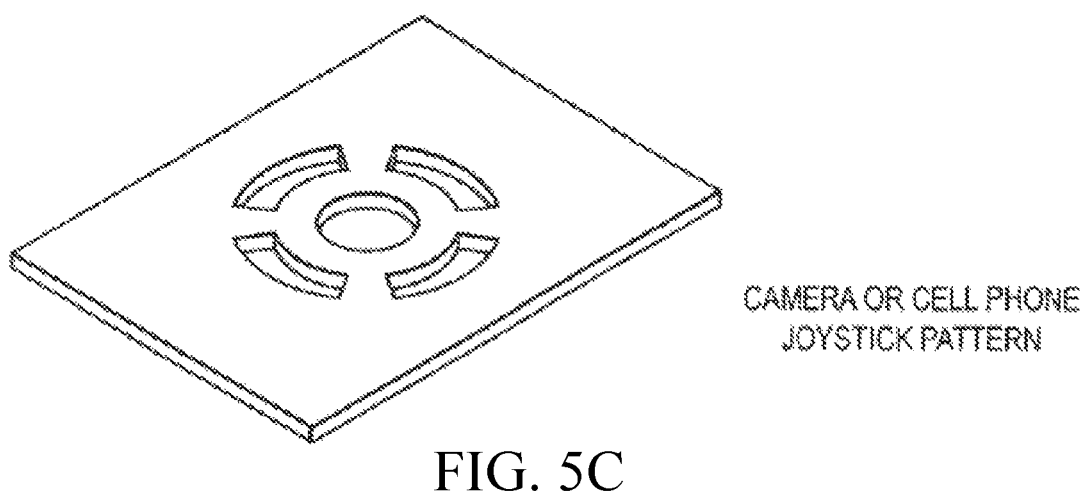
FIG. 5C shows an exemplary touchpad overlay with cutouts according to various aspects of the present invention.

Another alternative embodiment for the disclosed aspects of the present invention is to use the disclosed touchpad with or without supporting input gesture recognition with cellular phones, other cellular devices, Apple Computer Inc.'s Ipod MP3 player, etc., with the computer-like touchpad replacing some or all of the buttons on devices. Touch input with or without touch-based gesture recognition would be an ideal replacement for Apple's Ipod click wheel interface. The touch pad would preferably be made round (alternatively, it would be rectangular with the housing of the device providing a round aperture to the touchpad device) and simply by skimming a finger over or touching the touchpad at the appropriate places on the touch pad, the Ipod would be commanded to perform the proper function such as raising or lowering the volume, fast forwarding, slowing down replay, changing the selection, etc. This type of round touchpad is also contemplated for use on cell phones to simulate the old-fashioned rotary dial action or placement of digits. The user touches the pad at the appropriate place around the circumference of the touch pad to select digits and enter them and then makes a dialing motion (stroking a thumb or finger around the circumference of the touchpad) to begin the call or touches the center of the pad to begin the call. Round pattern dialing is easily done with the thumb when the phone is being single-handedly held. With reference to FIG. 5, in another embodiment, the touchpad, 94, is further contemplated to be fitted with a solid overlay having 2 or more cutouts over its surface (the solid overlay with cutouts is preferably part of the cell phone or other device's housing and alternatively, the solid overlay, 90, with cutouts, 92, is applied to the touchpad surface separately) that only allows for certain areas of the touchpad to actually be touched to assist the user in assuring that only certain well-defined areas of the touchpad are touched. This greatly reduces the software detection requirements for the touchpad interface software since now the software need only detect when a certain defined area is touched and assigns a specific function to that touched area and reports that to the device controller. That is, the cutout areas would essentially be soft keys but without there being a plurality of different keys, instead, simply different soft key locations on the same touchpad but delineated physically so that certain other areas of the touchpad simply cannot be touched. It is further contemplated that, in many instances, the cutouts can be made large enough so that finger-stroke gestures can still be made and discerned. Because of the nature of modern mouse-like touchpad technology and how it works, the firmness of a persons touch that actually registers as a touch can also be provided for by software and this feature is also contemplated for use herein. Additionally, the touchpad, covered by a solid overlay with cutouts, would be recessed below the upper surface of the overlay (by as much as desired) helping to minimize false touches. This would be a much cheaper input gathering structure and would replace some or all of the many buttons and joystick-like controller of the cell phone, Ipod, camera, etc. It is contemplated that a few generic touchpad shapes and sizes could be manufactured and serve a host of input functions, replacing literally tons of buttons and switches, since now the solid overlay with cutouts on top of the touchpad defines the areas that can be touched or gestured (see exemplary drawings of FIG. 5(b) and FIG. 5(c)), and touchpad software, well understood in the art, defines what meaning is ascribed to these touched locations and gestures and what degree of firmness of touch is required to actually register the touch. Tapping and gesture (i.e., a finger stroke) recognition would further extend this new input-gathering device capability but is not required. This new input-gather device can be used to replace all or some of the buttons or joystick-like controllers on cell phones, portable electronic devices, cordless phones, mp3 players, PDAs, cameras, calculators, point of sales terminals, computers, computer monitors, game controllers, radio, stereos, TV, DVD players, set-top boxes, remote controls, automobile interfaces, appliances, household switches light and appliance switches, etc. Additionally, use of an overlay with cutouts is not absolutely necessary to practicing the above teachings. Similar functionality can be accomplished by simply embedding, embossing, or surface applying area-delineating markings, preferably with labels, to the touchpad itself and allowing software to accept only those touches that occur in these defined areas and to give the labeled meaning to these areas when so touched. However, use of an overlay with cutouts is currently greatly preferred because of the tactile delineation of areas it provides.

Returning to the Ipod example, because of the large memory currently available with the Ipod, it is also contemplated that a digital camera, similar to cell phone's camera be embedded in the Ipod and coupled to the Ipod controller and this inventive Ipod be operable for taking pictures and storing the pictures in the Ipod's memory. Another alternate embodiment for the disclosed aspects of the present invention is to use the viewfinder use detector, gaze tracker, and/or the disclosed internet connectability, herein described, in a video camera. As with the camera system disclosure, the viewfinder use detector can be used to enable or disable various aspects of the video camera system, such as turning the LCD display off when viewfinder use is detected. Gaze tracking is contemplated to be used to assist the video camera focusing or used to guide and select menu items. Internet connectability is contemplated be used to download sound or image files for editing or for uploading video recorded for editing or remote storage of the video images.

It is further contemplated that certain aspects of the presently disclosed invention have application beyond those disclosed herein. For instance, various voice recognition aspects of the present invention, such as use of a plurality of microphones or multiple different vocal utterances associated with the same command or delayed implementation of a command which corresponds to a recognized vocalization, are contemplated to have utility for many of the devices herein referenced and are anticipated to be incorporated therein. As an example, automatically connecting to the internet when a set of predetermined rules or conditions (such as time, date, status of equipment, etc) is met would be useful for the download/upload of information from/to the internet, like music, video, etc. for processing, storage, transmission to another party, etc. Those skilled in the art will undoubtedly see various combinations and alternative embodiments of the various aspects of the present invention herein taught but which will still be within the spirit and scope of the invention.

What is claimed is:

1. A camera comprising a touchpad fitted with a solid overlay, the solid overlay having at least two cutouts on its surface, such that (1) the at least two cutouts provide defined areas for touch sensing on the touch pad and (2) each defined area for touch sensing corresponds to a defined camera function for a controller of the camera.

\* \* \* \* \*